(12) United States Patent
Schlipf et al.

(10) Patent No.: US 9,334,043 B2
(45) Date of Patent: May 10, 2016

(54) WING ASSEMBLY WITH A MAIN WING AND MOVABLE HIGH-LIFT BODY AND A METHOD FOR ADJUSTING A HIGH-LIFT BODY RELATIVE TO A MAIN WING

(71) Applicant: Airbus Operations GmbH, Hamburg (DE)

(72) Inventors: Bernhard Schlipf, Bremen (DE); Carsten Triebl, Aachen (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 14/138,715

(22) Filed: Dec. 23, 2013

(65) Prior Publication Data

US 2014/0246540 A1 Sep. 4, 2014

Related U.S. Application Data

(63) Continuation of application No. PCT/EP2012/002725, filed on Jun. 28, 2012.

(60) Provisional application No. 61/501,865, filed on Jun. 28, 2011.

(30) Foreign Application Priority Data

Jun. 28, 2011 (DE) .......................... 10 2011 105 912

(51) Int. Cl.
*B64C 9/02* (2006.01)
*B64C 9/22* (2006.01)
(Continued)

(52) U.S. Cl.
CPC ... *B64C 9/02* (2013.01); *B64C 3/50* (2013.01); *B64C 9/22* (2013.01); *B64C 9/24* (2013.01); *Y02T 50/145* (2013.01); *Y02T 50/32* (2013.01)

(58) Field of Classification Search
CPC .............. B64C 3/28; B64C 3/50; B64C 9/22; B64C 9/24; B64C 9/02
See application file for complete search history.

(56) References Cited

U.S. PATENT DOCUMENTS 2,500,512 A * 3/1950 Bowers .......................... 244/210
3,831,886 A * 8/1974 Burdges et al. ................ 244/207
(Continued)

FOREIGN PATENT DOCUMENTS

| CN | 101674980 A | 3/2010 |
|---|---|---|
| DE | 10 2005 027 749 | 12/2006 |

(Continued)

OTHER PUBLICATIONS

International Search Report for Application No. PCT/EP2012/002725 dated Mar. 26, 2013.
(Continued)

*Primary Examiner* — Joseph W Sanderson
(74) *Attorney, Agent, or Firm* — Jenkins, Wilson, Taylor & Hunt, P.A.

(57) ABSTRACT

A wing assembly and method for operating the wing assembly, the assembly having a main wing and high-lift body movably coupled to the leading edge of the main wing, the coupling achieved by a driving device, an adjusting lever arrangement having a first main wing lever coupled to the main wing formed between a first adjusting lever pivot joint and the high-lift body as well as a second main wing lever coupled to the main wing so as to form an effective lever arm between a second adjusting lever pivot joint and a first adjusting lever pivot joint, and at least one adjusting lever non-rotatably coupled to the high-lift body, the high-lift body being movable between an initial position and a maximally adjusted position with respect to the initial position, at least one guide mechanism aiding movement of the high-lift body.

11 Claims, 12 Drawing Sheets

(51) Int. Cl.
*B64C 9/24* (2006.01)
*B64C 3/50* (2006.01)

(56) References Cited

U.S. PATENT DOCUMENTS

| | | | |
|---|---|---|---|
| 3,847,369 A | 11/1974 | Phillips et al. | |
| 4,202,519 A * | 5/1980 | Fletcher | 244/214 |
| 5,158,252 A * | 10/1992 | Sakurai | 244/214 |
| 6,464,176 B2 * | 10/2002 | Uchida et al. | 244/216 |
| 7,264,206 B2 * | 9/2007 | Wheaton et al. | 244/214 |
| 7,293,744 B2 | 11/2007 | Perez-Sanchez et al. | |
| 7,963,484 B2 | 6/2011 | Raudszus et al. | |
| 8,186,630 B2 * | 5/2012 | Jaggard | 244/214 |
| 8,245,982 B2 * | 8/2012 | Vormezeele et al. | 244/214 |
| 8,286,921 B2 * | 10/2012 | Heller | 244/214 |
| 8,584,992 B2 | 11/2013 | Schlipf et al. | |
| 2007/0241236 A1 | 10/2007 | Whitehouse et al. | |
| 2008/0265089 A1 | 10/2008 | Zeumer | |
| 2010/0084515 A1 * | 4/2010 | Jaggard | 244/214 |
| 2010/0155542 A1 * | 6/2010 | Heller | 244/214 |
| 2010/0163685 A1 * | 7/2010 | Vormezeele et al. | 244/214 |
| 2011/0011984 A1 | 1/2011 | Voss et al. | |
| 2012/0061524 A1 | 3/2012 | Schlipf et al. | |

FOREIGN PATENT DOCUMENTS

| | | |
|---|---|---|
| DE | 10 2009 015 330 | 9/2010 |
| DE | 10 2009 037 707 | 3/2011 |
| DE | 10 2011 105 912.5 | 1/2013 |
| EP | 1404573 B1 | 11/2004 |
| EP | 2 116 467 | 11/2009 |
| WO | WO 2008/135266 | 11/2008 |
| WO | WO 2013/000577 | 1/2013 |

OTHER PUBLICATIONS

International Preliminary Report on Patentability for Application No. PCT/EP2012/002725 dated Jaunuary 7, 2014.
German Office Action for Application No. 10 2011 105 912.5 dated Jun. 10, 2014.
Chinese Office Action for Application No. 201280041502.8 dated May 15, 2015.

* cited by examiner

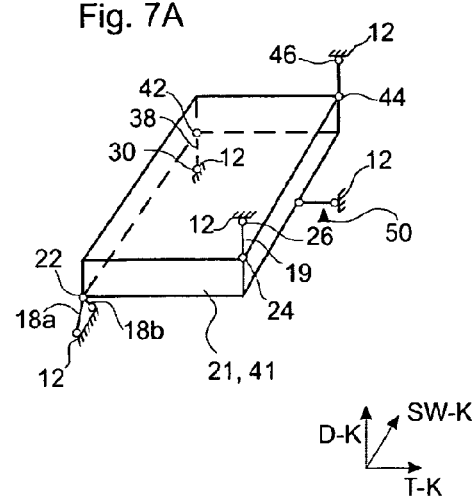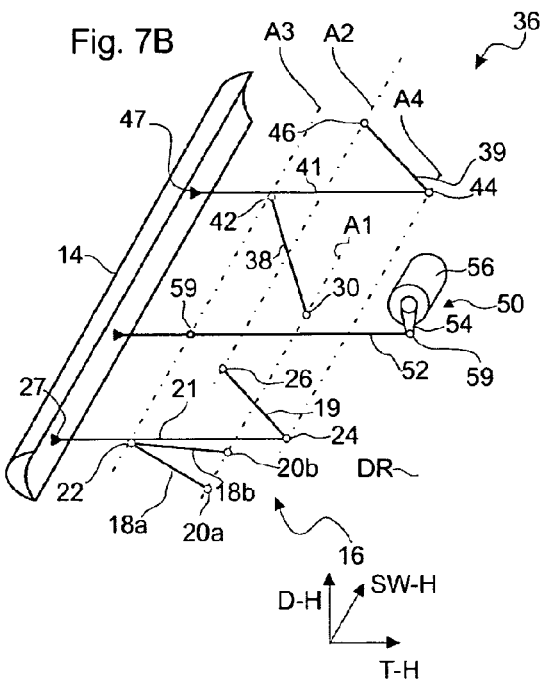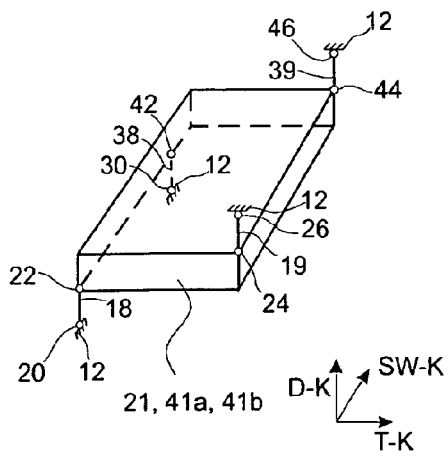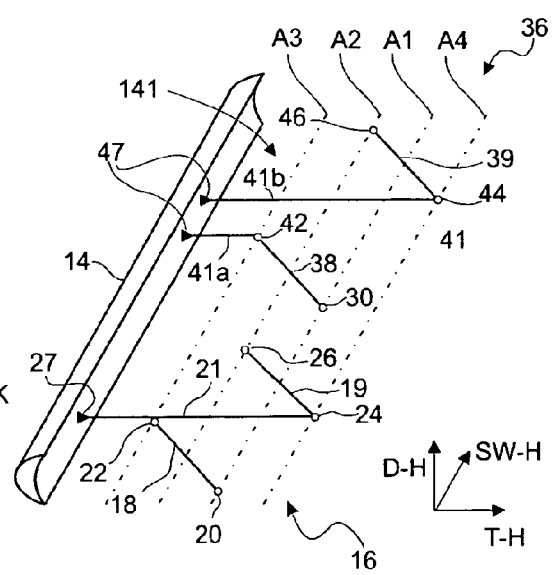

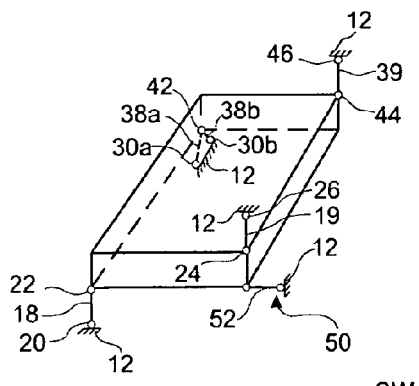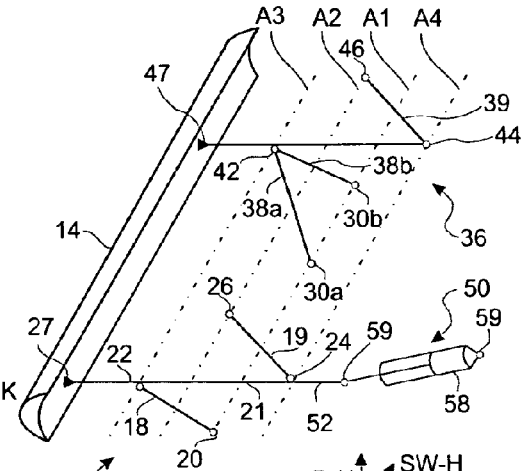
Fig. 9A  Fig. 9B
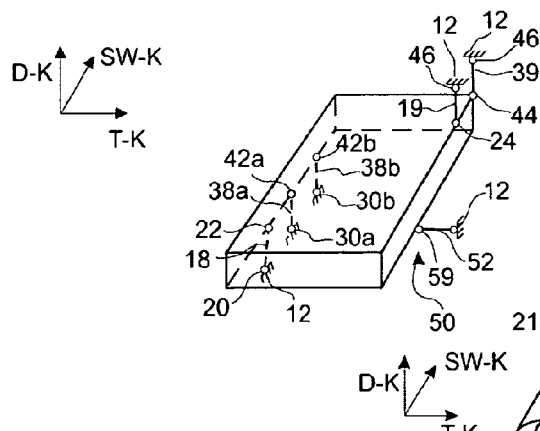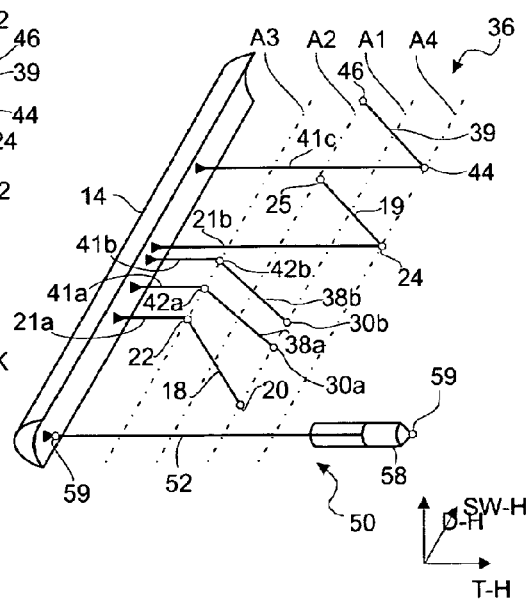
Fig. 10A  Fig. 10B

WING ASSEMBLY WITH A MAIN WING AND MOVABLE HIGH-LIFT BODY AND A METHOD FOR ADJUSTING A HIGH-LIFT BODY RELATIVE TO A MAIN WING

CROSS-REFERENCE TO RELATED APPLICATIONS

This application is a continuation of PCT Application Serial No. PCT/EP2012/002725, filed Jun. 28, 2012, which claims the benefit of the filing date of German Patent Application No. DE 10 2011 105 912.5, filed on Jun. 28, 2011 and of U.S. Provisional Application 61/501,865, filed on Jun. 28, 2011, the disclosures of which applications are hereby incorporated herein by reference.

TECHNICAL FIELD

The invention pertains to a wing assembly with a main wing and a high-lift body that is arranged on the main wing such that it can be moved between a retracted and an extended position, as well as to a method for adjusting a high-lift body relative to a main wing.

US 2007/0241236 A1 discloses an airfoil with a main wing and a slat that can be moved relative to the main wing such that a gap is formed. The guide mechanism is in the form of a multi-bar linkage.

DE 10 2005 027 749 A1 discloses an airfoil with a main wing and a so-called droop nose. In this case, no gap exists between the droop nose and the main wing in the extended position of the droop nose. The droop nose serves for changing the curvature of the airfoil and therefore the flow conditions on the airfoil.

WO 2008/135266 A1 describes a guide mechanism that is realized in the form of a four-bar linkage and serves for moving a leading edge flap between a retracted position and a position in which it is spaced apart from the main wing.

SUMMARY

It is the objective of the present invention to make available a wing assembly with a main wing and a high-lift body that is arranged on the leading edge of the main wing such that it can be moved between a neutral position and an extended adjusting position by a guide mechanism, as well as a method for adjusting a high-lift body relative to a main wing, wherein the wing assembly and the method make it possible to realize complex adjusting movements of the high-lift body and, in particular, an adaptation of adapting the rear region, especially the trailing edge of the high-lift body, to the contour of the front side of the main wing.

The above-defined objective is attained with the characteristics of the independent claims. Other advantageous embodiments are disclosed in the dependent claims that refer to these independent claims.

According to an aspect of the invention, a high-lift body or a regulating flap is coupled to the main wing by at least one guide mechanism that is realized in the form of a four-bar mechanism and in accordance with the invention. Although the description of the inventive embodiments refers to a high-lift body, it may, according to the invention generally also refer to a regulating flap. The advantage of utilizing the guide mechanism realized in accordance with the invention can be seen in that the levers coupling the high-lift body to the main wing can be dimensioned and arranged in such a way that they are also positioned within the outer contour of the main wing in the neutral position of the high-lift flap and the contour fairing of the main wing therefore does not have to be provided with any openings through which the levers of the guide mechanism protrude into the area outside the wing and therefore cause unfavorable aerodynamic effects in certain adjusting positions of the guide mechanism.

The guide mechanism according to the invention furthermore makes it possible to define a complex path along which reference points of the high-lift body move over the entire travel thereof. In this case, it would be possible, in particular, to closely guide the trailing edge of the high-lift body along the outer contour of the main wing of a wing assembly over its entire adjustment. In this way, particularly the profile of the main wing can essentially be optimized and defined in accordance with aerodynamic aspects and with consideration of the boundary conditions resulting from the guide mechanism of the high-lift body. Particularly, the profile extending in the chord direction can in this case be defined such that it does not contain a sharp bend, i.e., no abrupt curvature change, particularly in the region situated near the high-lift body. Such a sharp bend would cause significant rises in the serial data curve of the negative pressure coefficient over the profile of the main wing in the chord direction thereof, particularly in adjusting positions of the high-lift body in which a region with such a sharp bend is exposed, i.e., subjected to the flow, wherein these significant rises in the serial data curve should be prevented in the sense of an aerodynamic optimization.

According to an aspect of the invention, in particular, the following is proposed: a wing assembly having a main wing, at least one high-lift body that is arranged on the leading edge of the main wing such that it can be moved between an initial adjusting position and a maximally changed adjusting position with respect to the initial adjusting position, at least one guide mechanism, by which the high-lift body is movably coupled to the main wing, and a driving device for adjusting the high-lift body, wherein the guide mechanism comprises:

an adjusting lever arrangement with at least one adjusting lever, wherein at least one adjusting lever of the adjusting lever arrangement is coupled to the high-lift body, at least one first main wing lever coupled to the main wing by a first main wing pivot joint and to the at least one adjusting lever by a first adjusting lever pivot joint such that an effective lever arm is formed between the first adjusting lever pivot joint and the high-lift body, and at least one second main wing lever coupled to the main wing by a second main wing pivot joint and to the at least one adjusting lever by a second adjusting lever pivot joint such that an effective lever arm is formed between the second adjusting lever pivot joint and the first adjusting lever pivot joint, wherein the guide mechanism is realized in such a way that the first main wing pivot joint is arranged underneath the first adjusting lever pivot joint and the second main wing pivot joint is arranged above the second adjusting lever pivot joint with respect to the main wing thickness direction in the initial adjusting position of the high-lift body or wherein the guide mechanism is realized in such a way that the first main wing pivot joint is arranged above the first adjusting lever pivot joint and the second main wing pivot joint is arranged underneath the second adjusting lever pivot joint with respect to the main wing thickness direction in the initial adjusting position of the high-lift body.

According to an aspect of the invention, in particular, the following is proposed: a wing assembly with a main wing, at least one high-lift body that is arranged on the leading edge of the main wing such that it can be moved between a neutral position, or cruising, position and a maximally changed adjusting position with respect to the neutral position, or cruising, position or a regulating flap coupled to the main wing such that it can be moved between two positions, at least one guide mechanism by which the high-lift body or the regulating flap is movably coupled to the main wing, and a driving device for adjusting the high-lift body or the regulating flap. In this case, the guide mechanism provided in accordance to the invention may, in particular, comprise:

an adjusting lever arrangement having at least one high-lift body adjusting lever or adjusting lever, wherein at least one high-lift body adjusting lever or adjusting lever of the adjusting lever arrangement is coupled to the high-lift body by a coupling device, at least one first main wing lever coupled to the main wing by a first main wing pivot joint on its end on the side of the main wing and to the one adjusting lever or the adjusting lever arrangement at a distance from the first coupling point by a first adjusting lever pivot joint such that an effective lever arm is formed between the first adjusting lever pivot joint and the coupling device, namely in such a way that the first main wing pivot joint is arranged underneath the first adjusting lever pivot joint with respect to the main wing thickness direction and/or with respect to the flap thickness direction in the initial adjusting position of the high-lift body, at least one second main wing lever coupled to the main wing by a second main wing pivot joint on its end on the side of the main wing and to one adjusting lever or the adjusting lever arrangement by a second adjusting lever pivot joint such that an effective lever arm is formed between the second adjusting lever pivot joint and the first adjusting lever pivot joint, namely in such a way that the second main wing pivot joint is arranged above the second adjusting lever pivot joint with respect to the main wing thickness direction and/or with respect to the flap thickness direction in the initial adjusting position of the high-lift body if the first main wing pivot joint is arranged underneath the first adjusting lever pivot joint or the second main wing pivot joint is arranged underneath the second adjusting lever pivot joint if the first main wing pivot joint is arranged above the first adjusting lever pivot joint.

In this case, the at least one high-lift body adjusting lever or adjusting lever of the adjusting lever arrangement may be coupled to the high-lift body by the coupling device in a rotationally rigid fashion at least with respect to rotations about the wingspan direction of the high-lift body.

The wing assembly may be realized, in particular, in that the first main wing pivot joint is arranged underneath or above the first adjusting lever pivot joint and the second main wing pivot joint is arranged above or underneath the second adjusting lever pivot joint with respect to the main wing thickness direction in the initial adjusting position of the high-lift body, and/or the second main wing pivot joint is arranged above or underneath the second adjusting lever pivot joint with respect to the flap thickness direction in the initial adjusting position of the high-lift body.

These alternatives may be used exclusively, i.e., only one of the two alternatives may be realized or both may be realized in the sense of the phrase "and/or."

The initial adjusting, or cruising, position may, in particular, be the cruising position of the high-lift body and/or the adjusting position of the high-lift body in which the driving device is retracted the farthest.

According to an inventive embodiment of the wing assembly, the at least one guide mechanism is designed in such a way that the high-lift body is realized in the form of a "droop nose," i.e., an adjustable nose or nose wing, with a trailing edge such that a contour line of the high-lift body extending along the wingspan direction thereof and, in particular, the trailing edge of the high-lift body extends, at least sectionally, at a predetermined constant distance and/or at a relatively small, aerodynamically ineffective distance from the contour surface of the main wing while the adjusting movement of the high-lift body is carried out. Due to the guide mechanism realized in accordance with the invention, such an adjusting movement of the high-lift body can be realized with little mechanical effort and a high degree of flexibility. In this context, it would be possible, in particular, for the lengths of the first contour surface section and the second contour surface section in the chord direction of the high-lift body, respectively, to amount to half the maximum thickness of the high-lift body.

According to an embodiment of the invention, the high-lift flap in the form of a droop nose or adjustable nose is realized on the main wing, in particular, in such a way that the trailing edge thereof tightly adjoins the surface of the front section of the main wing in the entire adjusting range of the high-lift body or forms such a narrow gap of, in particular, less than 2 mm relative to the main wing that the air flowing through this gap in-flight has no particular aerodynamic effect on the flow on the suction side of the wing assembly. According to another embodiment of the invention, the relatively small, aerodynamically ineffective gap size with respect to the smallest distance between the high-lift flap and the main wing amounts to less than 0.1% with respect to the local main wing chord in any position of the high-lift flap. The adjustment of the high-lift flap realized in the form of a droop nose or adjustable nose therefore essentially changes the overall profile of the wing assembly or the envelope of the main wing and the adjustable nose.

According to another inventive embodiment of the wing assembly, it would be possible, in particular, that the outer contour surface of the main wing in the region of the trailing edge of the high-lift body, in its initial adjusting position, comprises a first contour surface section that, viewed in the chord direction of the main wing, is situated behind the rearmost contour line of the high-lift body with respect to the chord direction of the high-lift body and is covered by the high-lift body, as well as a second contour surface section that extends behind the first contour surface section viewed in the chord direction of the main wing, that profile lines extending along the chord direction of the main wing are in the first and the second contour surface section realized without a sharp bend and/or realized, in particular, such that the local curvature radius only has curvature radii greater than 20 mm as the coordinate of the chord direction of the main wing increases, wherein particularly the lengths of the first contour surface section and the second contour surface section in the chord direction of the high-lift body respectively correspond to half the maximum thickness of the high-lift body or, in other embodiments, to the maximum thickness of the high-lift body with respect to the thickness direction of the high-lift body.

The design of the profile without sharp bends means, in particular, that the profile lines in the first and the second contour surface section are, in their idealized form, free of sharp bends, i.e., that the first derivative of the curvature radius r with respect to the arc length is continuous along the contour of the first and the second contour surface section such that dr/ds is stepless, wherein ds is an infinitesimal part along the contour.

The embodiments of the main wing surface contour make it possible to improve the inflow characteristics and, in particular, to prevent an unsteadiness and/or discontinuity in the pressure curve along the flow around the main wing in the chord direction thereof. A wing assembly of this type can also be utilized independently of the guide mechanism used in accordance with the present invention. According to the invention, it may be realized, in particular, in combination with other types of guide mechanisms such as, for example, guide mechanisms that are not dependent on a four-bar linkage according to the present invention. Consequently, a wing assembly according to such an embodiment may form a separate object of the present invention, wherein the guiding path of the high-lift body differs from a circular path in accordance with the invention due to the design of the contour surface section of the outer contour surface of the main wing. In this way, the same inventive advantages as those initially cited in this description can be attained.

In an inventive wing assembly that either comprises inventive guide mechanisms or other guide mechanisms, it may also be advantageous if the curvature of the main wing continuously decreases in a second contour surface section of the main wing that borders on the first contour surface section in the chord direction of the main wing. In other words, it is ensured that the curvature continuously decreases from the inflow region of the main wing to its upper side. The continuity of the curvature of the main wing results in the flow against or around the main wing being optimized with respect to the fact that a significant pressure change and, in particular, an abrupt pressure change is prevented along the flow around the main wing in the chord direction thereof. This optimizes the aerodynamic performance, in particular, by reducing the aerodynamic drag of such a main wing.

The chord direction of the high-lift body is defined, in particular, in such a way that it extends parallel to the conventionally defined longitudinal axis or X-axis of the aircraft in the neutral position of the high-lift body.

From a technical point of view, a local curvature radius of less than 20 mm or, in special embodiments, less than 30 mm is in this case considered to be a non-differentiable location such that the region surrounding this location is herein considered to be a region, the local curvature radius of which does not continuously increase in the chord direction of the main wing. The profile lines extending in the chord direction of the main wing may, in particular, be shaped circularly.

According to another embodiment of the inventive wing assembly, it is proposed that the high-lift body, or the nose flap, is guided by the at least one guide mechanism during its movement between its initial adjusting, or retracted, position and its extended position in such a way that the rearmost contour line of the high-lift body with respect to the chord direction thereof is spaced apart from the outer contour surface of the main wing by no more than 10 mm, at least in the first and the second contour surface section. According to another embodiment of the inventive wing assembly, it is proposed that the rearmost contour line of the high-lift body with respect to the chord direction thereof is spaced apart from the outer contour surface of the main wing by no more than 10 mm in the entire adjusting range of the high-lift body.

According to another embodiment of the inventive wing assembly, it is proposed that the high-lift body is coupled to the main wing by two guide mechanisms that are spaced apart from one another in the wingspan direction of the main wing, wherein each of the guide mechanisms comprises:

a high-lift body adjusting lever arrangement or an adjusting lever arrangement with at least one high-lift body adjusting lever or adjusting lever, wherein at least one high-lift body adjusting lever or adjusting lever is coupled to the high-lift body by a coupling device in a rotationally rigid fashion, at least with respect to rotations about the wingspan direction of the high-lift body, at least one first main wing lever that is coupled to the main wing by a first main wing pivot joint on its end on the side of the main wing and at a distance from the first coupling point by a first adjusting lever pivot joint such that an effective lever arm is formed between the first adjusting lever pivot joint and the coupling device, namely in such a way that the first main wing pivot joint is arranged underneath the first adjusting lever pivot joint with respect to the main wing thickness direction and/or with respect to the flap thickness direction in the initial adjusting position, at least one second main wing lever that is coupled to the main wing by a second main wing pivot joint on its end on the side of the main wing and by a second adjusting lever pivot joint such that an effective lever arm is formed between the second adjusting lever pivot joint and the first adjusting lever pivot joint, namely in such a way that the second main wing pivot joint is arranged above the second adjusting lever pivot joint with respect to the main wing thickness direction and/or with respect to the flap thickness direction in the initial adjusting position.

In this case, the first and the second adjusting lever pivot joint may be respectively realized in the form of a spherical joint.

According to another embodiment of the inventive wing assembly or the guide mechanism provided in accordance with the invention, it is proposed that the main wing pivot joints of a first guide mechanism and the first adjusting lever pivot joint and/or the second adjusting lever pivot joint are respectively realized in the form of a spherical joint and at least one of the main wing pivot joints of a second guide mechanism is realized in the form of an axial joint with an axis of rotation that extends along the wingspan direction of the high-lift body.

According to another embodiment of the inventive wing assembly, it is proposed that the first adjusting lever pivot joint of a first guide mechanism and/or a second adjusting lever pivot joint of a second guide mechanism consist of or comprise axial joints that respectively allow an axial movement, wherein an axial joint component is respectively fixed in the wingspan direction of the main wing by an arrangement of main wing levers, and wherein several main wing levers are coupled to the respectively other first or second adjusting lever pivot joint in such a way that these adjusting lever pivot joints are fixed in the wingspan direction of the main wing.

The guide mechanism may be realized, in particular, in such a way that the second main wing pivot joint of the second guide mechanism and the second main wing pivot joint of the first guide mechanism form axial joints, particularly with axes of rotation that extend parallel to one another, and that the axes of rotation (according to the illustrations, the axes of the first main wing pivot joints) extend along the wingspan direction of the main wing at a distance from one another.

According to an embodiment of the invention, the respective first main wing pivot joints lie on a connecting line and the respective second main wing pivot joints also lie on a connecting line during the guidance of the high-lift flap by two or more than two guide mechanisms. In this case, slight deviations of, e.g., 1%, of the respective distance between the first main wing pivot joints or the second main wing pivot joints may occur in the technical implementation.

According to an embodiment of the invention, the connecting line of the respective first main wing pivot joints and the connecting line of the respective second main wing pivot joints intersect. According to an alternative embodiment of the invention, the connecting line of the respective first main wing pivot joints and the connecting line of the respective second main wing pivot joints extend parallel to one another.

According to another embodiment of the inventive wing assembly or the guide mechanism to be used in accordance with the invention, it is proposed that the high-lift body adjusting lever arrangement or adjusting lever arrangement of at least one guide mechanism is comprises at least two high-lift body adjusting levers or adjusting levers, wherein the adjusting levers of the adjusting lever arrangement are respectively coupled to the high-lift body in a rotationally rigid fashion, at least with respect to rotations about the wingspan direction of the high-lift body, wherein at least a first adjusting lever of the adjusting lever arrangement is coupled to the first main wing lever by a first adjusting lever pivot joint and a second adjusting lever is coupled to the second main wing lever by a second adjusting lever pivot joint, or a first adjusting lever of the adjusting lever arrangement is coupled to the main wing by at least one first adjusting lever that is coupled thereto by at least one first main wing pivot joint and coupled to the main wing by a first main wing pivot joint as well as by at least one second main wing lever that is coupled to the first adjusting lever by the second adjusting lever pivot joint and respectively coupled to the main wing by the second main wing pivot joint, wherein at least one second adjusting lever is coupled to the high-lift body in a rotationally rigid fashion, at least with respect to rotations about the wingspan direction of the high-lift body, and wherein the at least one second adjusting lever is coupled to the first adjusting lever in such a way that adjusting movements carried out thereby are transmitted to the main wing.

In the inventive wing assembly or the guide mechanism to be used in accordance with the invention, the driving device may have at least one actuator that is connected to the main wing and serves for moving at least one of the guide mechanisms, wherein the actuator is functionally connected to at least one of the main wing levers, one of the adjusting levers, or the high-lift body.

In the inventive wing assembly or the guide mechanism to be used in accordance with the invention, an actuator having an actuator lever may be arranged on the main wing and connected to the high-lift body, wherein a total of at least two universal joints between one or more of the high-lift body and the actuator lever, the actuator lever and the actuator, or between the actuator and the main wing are provided in the connecting path between the main wing and the high-lift body.

In the inventive wing assembly or the guide mechanism to be used in accordance with the invention, at least one of the main wing levers may comprise two lever arms that are jointly coupled to the adjusting lever in one of the high-lift body pivot joints on one end and respectively coupled to main wing pivot joints on the main wing that are spaced apart from one another in the wingspan direction of the main wing on the other end.

A driving device is coupled between the main wing and the high-lift flap in order to adjust the high-lift flap or to actuate the at least one guide mechanism, wherein the driving device can directly act upon the flap or directly upon a main wing lever or directly upon an adjusting lever.

If several guide mechanisms are used on a regulating flap, it would be possible, in particular, that at least one of the guide mechanisms on the high-lift flap is coupled to the connection by a corresponding coupling device in a rotationally rigid fashion at least with respect to rotations about the wingspan direction of the high-lift flap.

Furthermore, a high-lift flap that is arranged on the main wing by several guide mechanisms may be provided, wherein the coupling device of at least one of the guide mechanisms is rotationally rigid about the wingspan direction of the high-lift body in order to couple of the adjusting lever arrangement to the high-lift body, and wherein one of the following coupling devices furthermore may be respectively coupled to the main wing in a rotationally rigid fashion with respect to rotations about the thickness direction and/or the chord direction of the main wing:

the joint between the first main wing lever and the main wing, the joint between the second main wing lever and the main wing.

According to another embodiment, it is proposed that one of the several guide mechanisms is coupled to the high-lift flap with its adjusting lever arrangement in a rotationally rigid fashion with respect to rotations about the direction of the line of flux of the adjusting lever and the first main wing lever and/or the second main wing lever is additionally coupled to the high-lift flap in a rotationally rigid fashion with respect to rotations about the direction of the line of flux of the adjusting lever.

These embodiments respectively make it possible, in particular, to support the high-lift body on the guide mechanisms in such a way that tensions occurring in the high-lift body and/or the guide mechanisms due to external forces and bearing loads are minimized and the high-lift body and/or the guide mechanisms therefore can be realized with smaller dimensions.

According to an embodiment, each of the guide mechanisms comprises:

an adjusting lever arrangement with at least one adjusting lever, wherein at least one adjusting lever of the adjusting lever arrangement is coupled to the high-lift body by a coupling device, at least one first main wing lever that is coupled to the main wing by a first main wing pivot joint on its end on the side of the main wing and at a distance from the first coupling point by a first adjusting lever pivot joint such that an effective lever arm is formed between the first adjusting lever pivot joint and the coupling device, namely in such a way that the first main wing pivot joint is arranged underneath the first adjusting lever pivot joint with respect to the main wing thickness direction and/or with respect to the flap thickness direction in the initial adjusting position, at least one second main wing lever that is coupled to the main wing by a second main wing pivot joint on its end on the side of the main wing and by a second adjusting lever pivot joint such that an effective lever arm is formed between the second adjusting lever pivot joint and the first adjusting lever pivot joint, namely in such a way that the second main wing pivot joint is arranged above the second adjusting lever pivot joint with respect to the main wing thickness direction and/or with respect to the flap thickness direction in the initial adjusting position.

In this case, it would be possible, in particular, that the adjusting lever is coupled to the high-lift body in a rotationally rigid fashion with respect to all rotating directions in one of the guide mechanisms and the other guide mechanisms are coupled to the high-lift body in such a way that they respectively allow other rotations that go beyond fixing the rotation about the wingspan direction of the high-lift body.

Due to the utilization of the at least one inventive guide mechanism for coupling the high-lift body to the main wing and, in particular, a clearance between the first adjusting lever pivot joint and the coupling device on the high-lift body, as well as a clearance between the adjusting lever pivot joints and between the positions of the main wing levers on opposite sides of the at least one adjusting lever on one respective guide mechanism, particularly these components of the guide mechanism can be adjusted in such a way that the high-lift body and, in particular, its trailing edge can be moved along a more complex profile of the front section of the main wing at the same distance from the profile at least in the region of this guide mechanism during the adjustment thereof.

Due to the arrangement of the two main wing levers on opposite sides with respect to the plane defined by the wingspan direction of the high-lift body and the adjusting lever or with respect to the plane defined by the wingspan direction of the main wing and the adjusting lever, a guide mechanism only requires a relatively small installation space and it is also possible to realize the guide mechanism in such a way that it is completely situated within the enveloping contour of the entire wing that includes the contours of the main wing and of the high-lift body during its entire adjusting movement. This can be achieved, in particular, by providing a corresponding clearance between the first and the second main wing pivot joint of each guide mechanism in the chord direction of the main wing, wherein the clearance may, e.g., be greater than the length of the first or the second main wing lever. A particularly compact construction can furthermore be achieved in that the main wing pivot joints are spaced apart by a relatively small clearance that, in particular, amounts to no more than 1.5-times the length of the first or second main wing lever on the same guide mechanism in a preferred embodiment. A particularly suitable structural shape can furthermore be realized in that the lines of action of the first and the second main wing lever lie about parallel to one another in the initial adjusting position. The compactness of this design results in the above-described advantage, namely that the sequences of movements of the individual levers take place in a region that essentially lies completely within the contour of the main wing or essentially lies completely within the contour of the wing assembly, respectively.

Due to the reduced space requirement of such a guide mechanism, it can also be installed on particularly flat profiles of main wings without requiring any fairing on the main wing.

The inventive guide mechanism also makes it possible to realize an adjustment of the high-lift body on the leading edge of a main wing in such a way that a gap of predetermined size that, if applicable, depends on the adjusting position exists between the trailing edge of the high-lift body and the main wing in any adjusting position of the high-lift body.

In a guide mechanism according to the invention, it would be possible to arrange the main wing pivot joints of the guide mechanisms such that they are spaced apart from one another in the wingspan direction of the main wing in order to thusly absorb a torque acting in the chord direction of the main wing in a superior fashion.

In an inventive wing assembly, it may also be advantageous to realize one of the main wing pivot joints or both main wing pivot joints of a guide mechanism in the form of a spherical joint in order to reduce the risk of jamming the respective guide mechanism, particularly the individual pivot joints, and to reduce the bearing loads. In the realization of one of the guide mechanisms of a high-lift body or several or all guide mechanisms of a high-lift body, it is particularly advantageous to design one of the main wing pivot joints in the form of an axial joint and the respectively other main wing pivot joint in the form of a spherical joint. Due to this approach, it is possible to reduce bearing loads in the main wing pivot joints and the adjusting lever pivot joints, as well as tensions in the levers that result from deformations of the main wing and/or the high-lift body due to the application of aerodynamic loads.

The unidirectional support of the respective guide mechanism against torques about the chord direction of the main wing and/or forces in the wingspan direction may be realized differently for each guide mechanism, particularly also in dependence on the main wing pivot joints. For example, the support of a guide mechanism can be realized by designing the first and/or second main wing lever, e.g., in the form of an A-lever or a double lever. In the respective realization in the form of a double lever, the two levers may be coupled to the high-lift body adjusting lever or adjusting lever on opposite sides thereof. In the respective realization in the form of a double lever or A-lever, two joints or joint components that are spaced apart from one another may be coupled to the main wing such that they are spaced apart from one another by a clearance in the wingspan direction.

According to another embodiment of the inventive wing assembly, the wing assembly may be realized in such a way that at least one of the main wing levers comprises two lever arms that are jointly coupled to the high-lift body adjusting lever or adjusting lever in one of the adjusting lever pivot joints on one end and respectively coupled to the main wing in main wing pivot joints that are spaced apart from one another in the wingspan direction of the main wing on their other end. In other words, for example, a so-called A-lever that makes it possible to support the lever and therefore the corresponding guide mechanism against torques about the chord direction and/or forces in the wingspan direction of the main wing is formed in this way. The A-lever may be stabilized with other bar structures that extend, for example, along the wingspan direction of the main wing. In such an A-lever, the point of the A is connected to the high-lift body and the two legs of the A are connected to the main wing. The connections are realized by the corresponding pivot joints in this case. It would naturally also be possible to realize one or both main wing levers of both guide mechanisms in this way.

According to another exemplary embodiment, the high-lift body adjusting levers or adjusting levers or at least one of these high-lift body adjusting levers or adjusting levers of at least one of the guide mechanisms may be equipped with a pivot joint that precludes a rotation of the high-lift flap about the chord direction of the main wing. Such a joint may be realized in the form of a pure axial joint such as, for example, a hinge joint.

In an inventive wing assembly, it may also be advantageous if the first main wing pivot joint of the second guide mechanism and the first main wing pivot joint of the first guide mechanism form a first common axis of rotation. It may furthermore be advantageous if the second main wing pivot joint of the second guide mechanism and the second main wing pivot joint of the first guide mechanism also form a common axis of rotation. These two common axes of rotation are advantageously spaced apart from one another and extend along the wingspan direction of the main wing. In other words, an essentially parallel arrangement of the two axes can be achieved in this way.

According to another embodiment of the invention, the connecting device between the respective high-lift body adjusting lever or adjusting lever or the respective high-lift body adjusting lever or adjusting lever part and the high-lift body itself may also be realized in a rotationally rigid fashion in all three rotating directions, i.e., rigidly fixed. Such a connection can be realized, for example, by a connecting device with screws and/or rivets. Bonding or welding, as well as a one-piece design of the high-lift body and the high-lift body adjusting lever or adjusting lever, would also be conceivable within the scope of the present invention.

Due to the utilization of at least one inventive guide mechanism, particularly the utilization of all guide mechanisms between a main wing and a high-lift body coupled thereto, the profile of the front region of the main wing may sectionally have a shape other than circular along the chord direction of the main wing. In this case, the profile shape may be realized, in particular, in such a way that the region in which the trailing edge of the high-lift body is situated in its retracted position and which also contains the surroundings of this location, does not feature an abrupt change of curvature such that the characteristics of the flow against or around the profile are improved. In this way, abrupt pressure changes along the contour of the main wing are prevented such that an essentially continuous flow profile of the flow around the contour of the main wing is not only possible in the retracted position of the high-lift body, but also in its extended position.

In an inventive wing assembly, it may also be advantageous if the driving device features at least one actuator that is connected to the main wing and serves for moving at least one of the guide mechanism or for moving the high-lift body, respectively. This actuator is functionally connected to at least one of the main wing levers and/or one of the high-lift flap adjusting levers or adjusting levers and/or the high-lift body itself. Different embodiments of such a driving device are conceivable in this case. For example, the actuator may consist of or comprise a rotary actuator or of a linear actuator. The realization in the form of a rotary actuator may be advantageous for producing a direct connection between the actuator and the guide mechanism in one of the pivot joints. For example, the rotary actuator may be in direct contact with one of the main wing pivot joints and/or in direct contact with one of the adjusting lever pivot joints. However, the direct contact with one of the main wing pivot joints is preferred because this makes it possible to support the weight of the actuator in the main wing and therefore in the part of the wing assembly that is immovable relative to the main wing. A rotation of the rotary actuator in a pivot joint is followed by a corresponding movement of the lever coupled thereto.

When using linear actuators, they may engage on one of the levers, as well as directly on the high-lift body itself. In other words, a movement is specified or actuated, wherein the type and the direction of the movement are irrelevant for the driving device. The driving function realized by the driving device and the guiding function realized by the guide mechanisms therefore can be separated from one another in an inventive wing assembly. In case of a linear actuation, it is important that the actuator itself has such a mobility that the guiding path of the high-lift body that is solely defined by the two guide mechanisms is not impaired. Particularly jamming of the actuator needs to be prevented when the high-lift body moves along its path defined by the guide mechanisms. The linkage therefore only specifies the actuation, i.e., the adjusting paths, while the guiding path is solely predefined by the guide mechanisms and the levers arranged therein. The location of the actuation therefore can be distinguished from the location of the guide mechanisms such that a different arrangement and therefore a space-saving design of the driving device and, in particular, the actuator can be realized within the main wing.

According to the invention, an actuator lever that is connected to the actuator, as well as to the high-lift body, at locations that are spaced apart from one another may also be provided. In this case, a total of at least two universal joints, in particular exactly two universal joints, between the high-lift body and the actuator lever and/or between the actuator lever and the actuator and/or between the actuator and the main wing may be realized in the connecting path between the main wing and the high-lift body. Universal joints are therefore provided at two of the above-mentioned locations. It is preferred to provide exactly two such universal joints. Due to the fact that corresponding universal joints are provided, the actuator can carry out its movement and does not represent an impairment for the guiding path of the high-lift body that is defined by the guide mechanisms. In other words, the guiding function and the driving function are decoupled from one another in this way. The same design of an actuator lever with the inventive universal joints naturally can also be used if the actuator lever is not directly connected to the high-lift body, but rather to one of the levers of the guide mechanisms. In such an instance, the connecting path between the main wing and the respective lever such as, for example, the first or the second main wing lever or the adjusting lever, contains a total of at least two universal joints between the corresponding lever and the actuator lever and/or between the actuator lever and the actuator and/or between the actuator and the main wing.

According to another aspect of the invention, a method for adjusting a high-lift body relative to a main wing of an wing assembly between an initial adjusting position and a changed adjusting position with respect to the initial adjusting position on the leading edge of the main wing is proposed, wherein the adjustment of the high-lift body is realized by:
  moving at least one adjusting lever coupled to the high-lift body,
  moving at least one first main wing lever that is coupled to the main wing and to the adjusting lever such that a lever arm is formed between a first adjusting lever pivot joint, by which the main wing lever is coupled to the at least one adjusting lever, and the high-lift body,
  moving at least one second main wing lever that is coupled to the main wing and to the adjusting lever such that a lever arm is formed between a second adjusting lever pivot joint, by which the main wing lever is coupled to the at least one adjusting lever, and the first adjusting lever pivot joint,
wherein the guide mechanism is realized in such a way that the first main wing pivot joint is arranged underneath the first adjusting lever pivot joint and the second main wing pivot joint is arranged above the second adjusting lever pivot joint with respect to the main wing thickness direction in the initial adjusting position of the high-lift body
or
wherein the guide mechanism is realized in such a way that the first main wing a pivot joint is arranged above the first adjusting lever pivot joint and the second main wing pivot joint is arranged underneath the second adjusting lever pivot joint with respect to the main wing thickness direction in the initial adjusting position of the high-lift body.

In this case, the high-lift body can be adjusted relative to a main wing by at least one guide mechanism and a driving device for adjusting the high-lift body may be coupled to a component of the guide mechanism or the high-lift body, wherein the guide mechanism features:

an adjusting lever arrangement with at least one adjusting lever, wherein at least one adjusting lever is coupled to the high-lift body, at least one first main wing lever that is coupled to the main wing by a first main wing pivot joint and to the at least one adjusting lever by a first adjusting lever pivot joint such that an effective lever arm is formed between the first adjusting lever pivot joint and the high-lift body, at least one second main wing lever that is coupled to the main wing by a second main wing pivot joint and to the at least one adjusting lever by a second adjusting lever pivot joint such that an effective lever arm is formed between the second adjusting lever pivot joint and the first adjusting lever pivot joint.

In the inventive method, it would be possible that a contour line of the high-lift body that extends along the wingspan direction thereof and, in particular, the trailing edge of the high-lift body at least sectionally extend at a predetermined constant distance and/or at a small, aerodynamically ineffective distance from the contour surface of the main wing while the adjusting movement of the high-lift body is carried out, wherein it is proposed, in particular, that the high-lift body is guided by the at least one guide mechanism in such a way during its movement between its retracted and extended positions that the rearmost contour line of the high-lift body with respect to the high-lift body chord direction is spaced apart from the outer contour surface of the main wing by no more than 10 mm at least in the first and the second contour surface section of the main wing or in the entire adjusting range of the high-lift body.

In the inventive method, it would be possible that the outer contour surface of the main wing in the region of the trailing edge of the high-lift body, in its initial adjusting position, comprises a first contour surface section that, viewed in the chord direction of the main wing, is situated behind the rearmost contour line of the high-lift body with respect to the chord direction of the high-lift body and is covered by the high-lift body, as well as a second contour surface section that extends behind the first contour surface section, viewed in the chord direction of the main wing, that profile lines extending along the chord direction of the main wing are in the first and the second contour surface section realized without a sharp bend and, in particular, such that the local curvature radius only has curvature radii greater than 20 mm as the coordinate of the chord direction of the main wing increases, wherein particularly the lengths of the first contour surface section and the second contour surface section in the chord direction of the high-lift body respectively correspond to half the maximum thickness of the high-lift body.

In the inventive method, it would be possible that the first and the second adjusting lever pivot joint are respectively realized in the form of a spherical joint and/or that the main wing pivot joints of a first guide mechanism and the first adjusting lever pivot joint and/or the second adjusting lever pivot joint are respectively realized in the form of spherical joints and at least one of the main wing pivot joints of a second guide mechanism is realized in the form of an axial joint with an axis of rotation that extends along the wingspan direction of the high-lift body.

In the inventive method, it would be possible that the first adjusting lever pivot joint of a first guide mechanism and/or a second adjusting lever pivot joint of a second guide mechanism comprise axial joints that respectively allow an axial movement, wherein an axial joint component is respectively fixed in the wingspan direction of the main wing by an arrangement of main wing levers, and that several main wing levers are coupled to the respectively other first or second adjusting lever pivot joint in such a way that these adjusting lever pivot joints are fixed in the wingspan direction of the main wing, or that the adjusting levers of the adjusting lever arrangement are respectively coupled to the high-lift body in a rotationally rigid fashion at least with respect to rotations about the wingspan direction of the high-lift body, wherein at least one first adjusting lever of the adjusting lever arrangement is coupled to the first main wing lever by a first adjusting lever pivot joint and a second adjusting lever is coupled to the second main wing lever by a second adjusting lever pivot joint, or that a first adjusting lever of the adjusting lever arrangement is coupled to the main wing by at least one first adjusting lever that is coupled thereto by at least one first main wing pivot joint and coupled to the first adjusting lever by a first adjusting lever pivot joint, as well as by at least one second main wing lever that is coupled to the first adjusting lever by the second adjusting lever pivot joint and respectively coupled to the main wing by the at least one second main wing pivot joint, wherein at least one second adjusting lever is coupled to the high-lift body in a rotationally rigid fashion at least with respect to rotations about the wingspan direction of the high-lift body, and wherein the at least one second adjusting lever is coupled to the first adjusting lever in such a way that adjusting movements carried out thereby and, in particular, translatory adjusting movements in the chord direction of the high-lift body and the thickness direction of the high-lift body and/or rotatory adjusting movements about the wingspan direction of the high-lift body are transmitted to the second adjusting lever.

BRIEF DESCRIPTION OF THE DRAWINGS

The present invention is described in greater detail below with reference to the drawings in the enclosed figures. In this case, the terms "left," "right," "top" and "bottom" may refer, in particular, to an orientation of the figures with normally legible reference symbols. In these figures:

FIG. 7A schematically shows an embodiment of inventive guide mechanisms;

FIG. 7B shows the geometric arrangement of the guide mechanisms according to FIG. 7A;

FIG. 8A schematically shows an embodiment of inventive guide mechanisms;

FIG. 8B shows the geometric arrangement of the guide mechanisms according to FIG. 8A;

FIG. 9A schematically shows an embodiment of inventive guide mechanisms;

FIG. 9B shows the geometric arrangement of the guide mechanisms according to FIG. 9A;

FIG. 10A schematically shows an embodiment of inventive guide mechanisms;

FIG. 10B shows the geometric arrangement of the guide mechanisms according to FIG. 10A;

DETAILED DESCRIPTION

The description of the adjustment of the high-lift body 14 relative to the main wing 12 refers to a main wing coordinate system with a main wing wingspan direction SW-H, a main wing chord direction T-H and a main wing thickness direction D-H, as well as to a high-lift body coordinate system or flap coordinate system with a high-lift body or flap wingspan direction SW-K, a high-lift body or flap chord direction T-K and a high-lift body or flap thickness direction D-K. The main wing thickness direction D-H may extend, in particular, in the direction of the vertical axis of the aircraft to which the main wing is attached. In this case, "top" should be interpreted in such a way that the suction side S1 of the main wing 12 is the "upper" side thereof and the pressure side S2 of the main wing 12 is the lower side of the main wing 12 during a normal flow direction S3 against the wing assembly 10 or the aircraft.

The high-lift body 14 used for the wing assembly 10 proposed in accordance with the invention may generally comprise a leading edge flap and, in particular, a droop nose, i.e., an adjustable nose, or a slat that is arranged on the front side with respect to the flow direction S3 against the wing assembly 10. According to the invention, however, it would also be possible that the high-lift body 14 comprises a control flap or a rudder flap and therefore generally of a regulating flap that is arranged on or in the vicinity of the trailing edge of the main wing 12 with respect to the flow direction S3. The embodiments of the guide mechanism 16, 36 according to the invention, in particular, generally serve for the adjustment of a regulating flap on a main wing 12.

Figure 1:
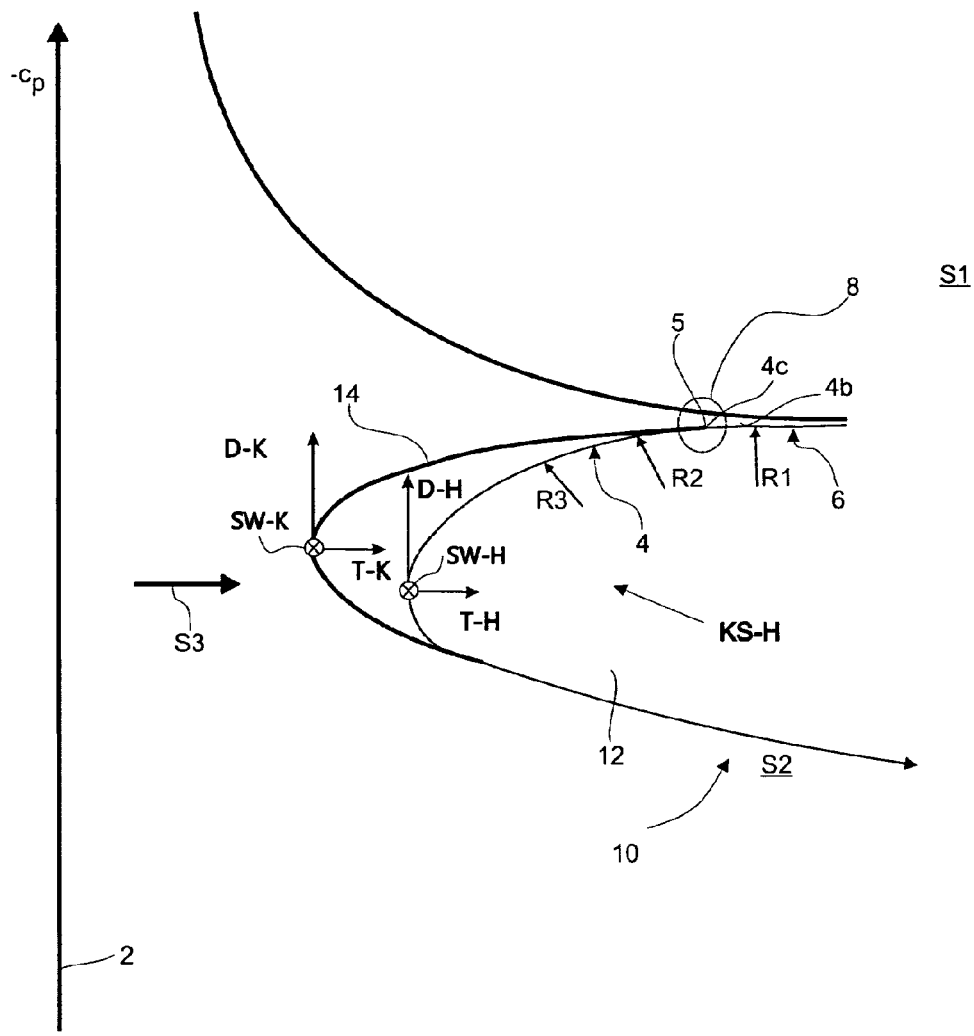
FIG. 1 schematically shows a cross section of the contour of an inventive wing assembly and the serial data curve of the negative pressure coefficient over this wing assembly.

FIG. 1 schematically shows an embodiment of the wing assembly 10 provided in accordance with the invention in the form of a contour profile. The wing assembly 10 features a main wing 12 and a high-lift body 14 that is arranged in front of the main wing 12 and realized in the form of an adjustable nose or droop nose. The high-lift body 14 is illustrated in its initial adjusting position, or retracted position, in which it covers a first contour surface section 4 that extends in the main wing chord direction T-H and in front of the location of the main wing 12 that lies closest to the trailing edge 5 of the high-lift body 14. The location 4c of the main wing 12 that lies closest to the trailing edge 5 of the high-lift body 14 is the location 4c on the surface of the main wing 12 that is spaced apart from the trailing edge 5 of the high-lift body 14 by the shortest distance with respect to the wingspan direction of the main wing SW-H. The main wing 12 furthermore features a second contour surface section 6 that extends in the main wing chord direction T-H and behind the location 4c of the main wing 12 that lies closest to the trailing edge 5 of the high-lift body 14.

The contour surface area that comprises the first and the second contour surface section 4, 6 is realized in such a way that its contour lines extending in the main wing chord direction T-H have a continuously changing curvature—at least sectionally in the wingspan direction of the main wing SW-H, i.e., they only have continuously or steadily and, in particular, differentiably changing curvature radii in the chord direction T-H. In this contour surface area, the contour lines extending in the main wing chord direction H-T therefore feature no abrupt change of curvature. Curvature radii of less than 5 mm along the edge extending in the wingspan direction of the main wing SW-H are considered to be the definition of an abrupt change of curvature, wherein these curvature radii result in an acceleration of the flow that should be prevented in accordance with the invention and an associated reduction of the static pressure in the pressure curve for the pressure of the laminar flow on the main wing 12 over the main wing chord direction T-H. In the ($-c_p$)-curve illustrated in FIG. 1, the course of the negative, dimensionless static pressure ($-c_p$) that is largely attained in accordance with the invention is illustrated in the form of a function curve in which no so-called suction peaks occur. According to the invention, the contour lines only have curvature radii of more than 10% of the average curvature radii occurring in the contour surface area 4a, 4b along the high-lift body chord direction T-K, particularly at the location 4c of the main wing 12 that lies closest to the trailing edge of the high-lift body 5 and/or in the contour surface area 4a, 4b. In this context, it is proposed, in particular, that the length of the first contour surface section 4a and the second contour surface section 4b in the high-lift body chord direction T-K respectively amount to half the maximum thickness of the high-lift body 14. Due to this design of the contour lines of the flow surface in the aforementioned region, an abrupt change of curvature in the contour lines of the flow surface is prevented in this region in accordance with the invention.

Figure 2:
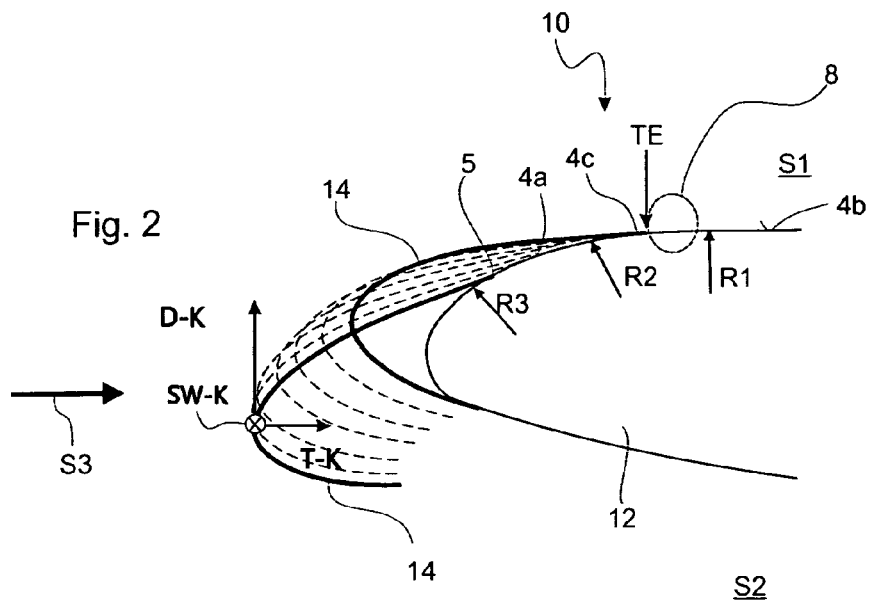
FIG. 2 schematically shows a cross section of the contour of an inventive wing assembly with partially extended high-lift body.
Figure 3:
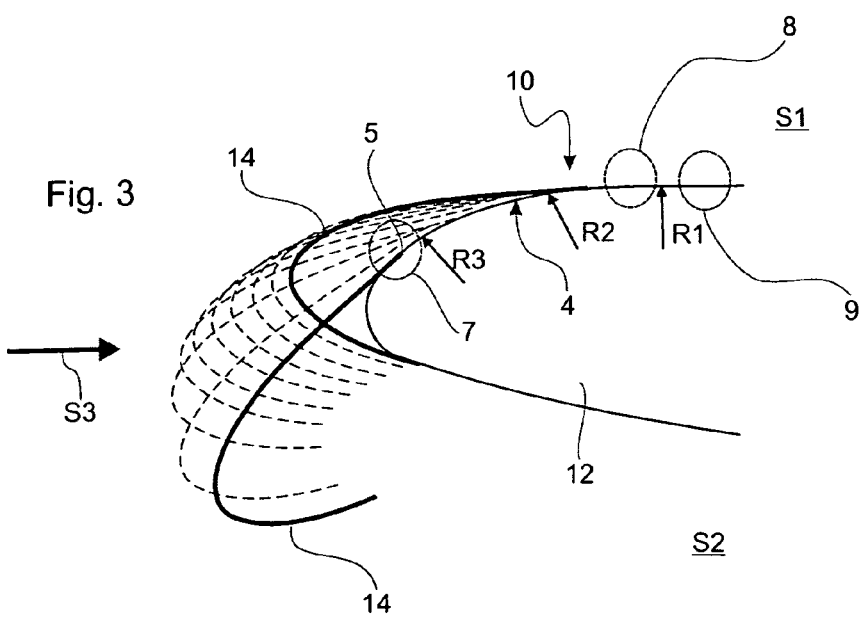
FIG. 3 shows the illustration according to FIG. 2 with completely extended high-lift body.

For illustrative purposes, FIGS. 1 to 3 show a curvature radius R3 that is assigned to the first contour surface section 4a, a curvature radius R1 that is assigned to the second contour surface section 4b and a curvature radius R2 that is assigned to the intermediate region situated between these contour surface sections 4a, 4b and, in particular, the location of the main wing 12 that lies closest to the trailing edge of the high-lift body 14.

Consequently, the second contour surface section 4b is a section that is not covered by the high-lift body 14 in the retracted and the extended state thereof. This region has another radius R1 that defines a curvature in the second contour surface section 4b, wherein this curvature also is a continuously changing curvature. In other words, the curvature extends over the main wing 12 in a steadily or continuously changing fashion.

FIGS. 2 and 3 shows the high-lift body 14 in different positions or adjusting positions. In this case, the high-lift body 14 is illustrated once in its retracted position and once in one of the extended positions with continuous lines in each of the two FIGS. 2 and 3. Intermediate positions are illustrated with broken lines between the two positions illustrated with continuous lines, wherein these intermediate positions respectively can be assumed by the high-lift body 14 over the guiding path thereof or are assumed during the course of the movement. The adjusting options of the high-lift body 14 may be realized such that each or only a few of these intermediate positions can also be assumed in a fixed fashion in order to achieve an aerodynamic effect assigned to this position.

In FIG. 2, the high-lift body 14 illustrated in an adjusting position with continuous lines is only partially extended while the high-lift body 14 illustrated in an adjusting position with continuous lines in FIG. 3 is in the completely extended position. In an embodiment of the wing assembly 10 provided in accordance with the invention, this wing assembly 10 features a high-lift body 14, in particular, of the type illustrated in these two figures, wherein the high-lift body 14 can be moved along the outer contour of the main wing 12 and essentially forms no aerodynamically effective gap between the two components during this process. Particularly in such an embodiment, the high-lift body 14 and, in particular, its trailing edge 5 follow the outer contour 4a of the main wing 12. On a main wing 12, e.g., with the profile contour illustrated in FIGS. 1 to 3, such a movement of a high-lift body 14 is only possible if it extends along a guiding path in such a way that the movement of fixed points of the high-lift body 14 deviates from a circular path when the outer contour of the main wing 12 has a steadily changing curvature and differs from a circular shape.

According to an embodiment of the invention, the high-lift body 14 is realized in the form of an adjustable nose that can be moved along the front contour of the main wing 12 and essentially forms no aerodynamically effective gap between the high-lift body 14, or the nose flap, and the main wing 12 during this process. The actual gap between these two components is advantageously smaller than 50 mm, particularly smaller than 20 mm. It may also be advantageous to realize designs in which the actual gap is smaller than 10 mm. Due to the utilization of an inventive wing assembly 10, the path of the high-lift body 14 can be adapted to the aerodynamically optimized shape of the front contour of the main wing 12 and not vice versa. In this way, the aerodynamics of the entire wing assembly 10 can be improved because the aerodynamic requirements for the main wing 12 and for the high-lift body 14, or the nose flap, can be fulfilled separately.

Figure 4:
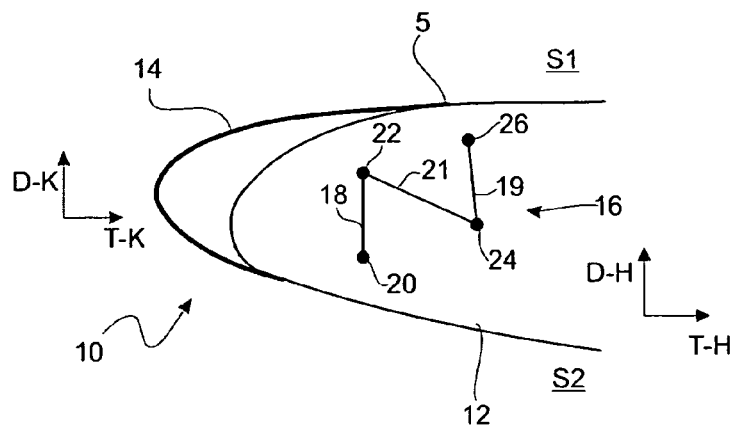
FIG. 4 shows a schematic representation of an embodiment of an inventive wing assembly with four-bar linkage, wherein the high-lift body is illustrated in the retracted position.
Figure 5:
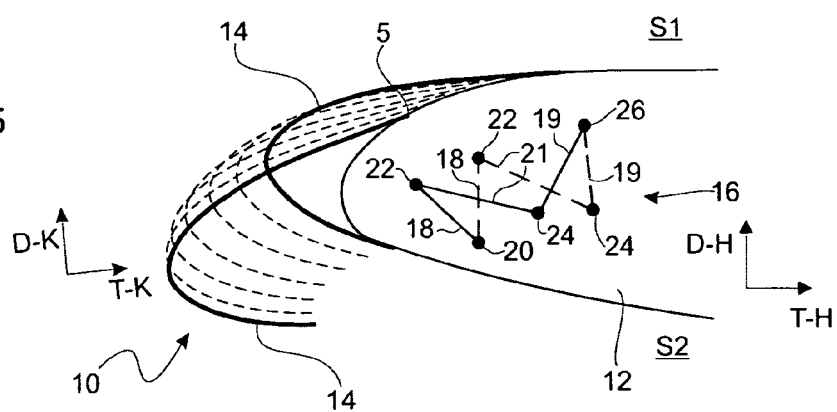
FIG. 5 shows the embodiment according to FIG. 4 with the high-lift body in a partially extended position.
Figure 6:
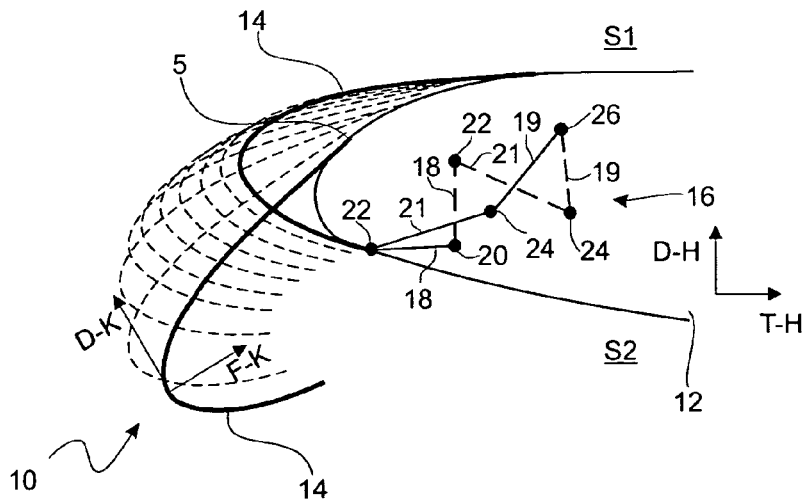
FIG. 6 shows the embodiment according to FIGS. 4 and 5 with completely extended high-lift body.

FIGS. 4, 5 and 6 schematically show an embodiment of the inventive wing assembly 10 according to FIGS. 1 to 3 with an embodiment of a guide mechanism 16 for actuating or adjusting the high-lift body 14. This option is realized in the form of a four-bar lever system that is schematically illustrated in the interior of the main wing 12. In this case, the four-bar system represents one of the two guide mechanisms, namely the guide mechanism 16. This guide mechanism 16 is schematically composed of three levers 18, 19 and 21, as well as four joints 20, 22, 24 and 26. In this case, two main wing levers 18 and 19 are provided and supported in an articulated fashion in respective main wing pivot joints 20 and 26 on the main wing 12 with their first end. The two main wing pivot joints 26 and 20 may consist of or comprise rotary joints such as, for example, spherical joints or of axial joints such as, for example, hinge joints. The two main wing levers 18 and 19 are connected to one another with the aid of a high-lift body adjusting lever or adjusting lever 21. The high-lift body adjusting lever or adjusting lever 21 is respectively connected to one of the main wing levers 18 and 19 in an articulated fashion by the two adjusting lever pivot joints 22 and 24. The schematic illustrations according to FIGS. 4 and 6 do not show the connection between the first guide mechanism 16 and the high-lift body 14. This connection is illustrated in the other figures in different constructive realizations according to the invention.

The connection or coupling between the first guide mechanism 16 and the high-lift body 14 may, in particular, be realized in such a way that a connecting device 27 is provided and produces the connection between the high-lift body 14 and the high-lift body adjusting lever or adjusting lever 21, namely in such a way that the high-lift body 14 is coupled to or mounted on the high-lift body adjusting lever or adjusting lever 21 in a rotationally rigid fashion with respect to rotations about the wingspan direction of the main wing SW-H. In addition, a wing assembly 10 may be provided with an embodiment of the guide mechanism 16 in which the adjusting lever is not coupled to the high-lift body adjusting lever or adjusting lever 21 in a rotationally rigid fashion with respect to rotations about the wingspan direction of the main wing 12 or the high-lift body 14, particularly if at least one other guide mechanism 16 for coupling the high-lift flap 14 and the main wing 12 is arranged on the wing assembly 10 and features an adjusting lever that is coupled to the high-lift body in a rotationally rigid fashion with respect to rotations about the wingspan direction of the main wing SW-H or the high-lift body SW-K. In this case, the mounting point is spaced apart from the two adjusting lever pivot joints 22, 24. In this way, the two adjusting lever pivot joints 22 and 24 extend around the respective main wing pivot joints 20 and 26 along a circular path while all points of the high-lift body adjusting lever 21 that are spaced apart from the two adjusting lever pivot joints 22 and 24 move along paths that do not circularly extend around the main wing pivot joints 20, 26. Consequently, the extension of the high-lift body 14 also takes place on a path that differs from a circular path.

FIGS. 7A and 7B schematically show a first embodiment of an inventive wing assembly 10 and the connection between the main wing 12 and the high-lift body 14. In this pair of figures, as well as in the following pairs of figures, the figure with the capital letter A respectively represents the schematic mechanical bearing layout and the figure with the capital letter B represents the three-dimensional arrangement of the actual bar structures.

The embodiment according to FIGS. 7A and 7B has a design that basically corresponds to all mechanical embodiments of the two guide mechanisms 16 and 36. Each of the two guide mechanisms 16 and 36 respectively features a high-lift body adjusting lever or adjusting lever 21 or 41. These high-lift body adjusting levers or adjusting levers 21 and 41 are connected to the high-lift body 14 in a rotationally rigid fashion with respect to rotations about the wingspan direction of the main wing 12 by respective rotationally rigid connecting devices 27 and 47. In this case, the guide mechanisms 16 and 36 respectively feature two main wing levers 38 and 39 and 18 and 19, particularly 18a and 18b. All main wing levers 38, 39, 18a, 18b and 19 are connected to the main wing 12 in an articulated fashion by a main wing pivot joint 20a, 20b, 26, 30 and 46 on one of their ends. In this way, all main wing levers 18a, 18b, 19, 38 and 39 can rotate about the respective pivot joint 20a, 20b, 26, 30 and 46 on a circular path. In order to transmit this rotation to the high-lift body 14 in such a way that it moves along a guiding path that differs from a circular path, one respective high-lift body adjusting lever or adjusting lever 21 or 41 is provided for each guide mechanism 16 and 36 and connects the two main wing levers 18a, 18b, 19, 38 and 39 of each guide mechanism 16 and 36 to one another by two respective adjusting lever pivot joints 22, 24, 42 and 44. In this way, a double four-bar system is formed, i.e., two four-bar systems are formed by two guide mechanisms 16 and 36 as schematically illustrated in FIGS. 4 to 6.

The connecting device 27 and/or 47 between the first guide mechanism 16 and/or 36 and the high-lift body 14 may be realized, in particular, in such a way that the high-lift body 14 is coupled to or mounted on the high-lift body adjusting lever or adjusting lever 21 and/or 41 in a rotationally rigid fashion with respect to rotations about the wingspan direction of the main wing SW-H and/or about the wingspan direction of the high-lift body SW-K, wherein the adjusting lever 21 and/or 41 is coupled, e.g., by a sliding block guide such that it can be longitudinally displaced, particularly in or along the wingspan direction of the high-lift body 14.

The respective main wing levers 18a, 18b, 19, 38 and 39 rotate about the respective pivot joint 20a, 20b, 26, 30 and 46 such that a movement of the respective high-lift body adjusting levers or adjusting levers 21 and 41 takes place. Since the high-lift body lever or adjusting lever 21 or 41 of each guide mechanism 16 and 36 is connected to the high-lift body 14 by the connecting devices 27 and 47 in a rotationally rigid fashion with respect to torques about the wingspan direction of the main wing SW-H, it is moved along a path that differs from a circular path.

A driving device 50 is provided for realizing the movement along the guiding path of the high-lift body 14 that is defined by the guide mechanisms 16 and 36. This driving device 50 features an actuator lever 52 that is functionally connected to a rotary actuator 56. The rotary actuator 56 features a driving arm 54 that is coupled to the actuator lever 52 by a universal joint 59. Furthermore, an articulated support in the form of a universal joint 59 is provided at a total of two locations along the connecting path between the rotary actuator 56 and the high-lift body 14 such that the high-lift body 14 can be directly driven without impairing its guiding path or jamming the actuator lever 52. The embodiment according to FIGS. 7A to 7B therefore features a direct drive of the high-lift body 14. This is possible because a separation of the drive in the form of the driving device 50 and the guidance in the form of the guide mechanisms 16 and 36 can be technically realized without any problems.

In the first guide mechanism 16 of the embodiment according to FIGS. 7A and 7B, the first main wing lever 18 is furthermore divided into two first main wing levers 18a and 18b. These first main wing levers 18a, 18b are connected to the adjusting lever 21 in an articulated fashion in a common adjusting lever pivot joint 22 on one end. The two other ends of each main wing lever 18a and 18b are spaced apart from one another in the wingspan direction of the main wing SW-H and supported on the main wing 12 in an articulated fashion in main wing pivot joints 20a and 20b. In this way, a so-called A-lever is formed that supports the first guide mechanism 16 against loads in the wingspan direction of the main wing SW-H. Consequently, all degrees of freedom of the overall system consisting of or comprising the guide mechanisms 16 and 36 and the high-lift body 14, as well as the main wing 12, except for the desired guiding path that deviates from a circular path are blocked under the prerequisite that the lines of action of the levers 19 and 39 do not extend parallel to the line of action of the lever 38 in combination with the connecting devices 27 and 47 between the adjusting levers 21 and 41 and the high-lift body 14 that respectively are rotationally rigid with respect to rotations about the wingspan direction of the high-lift body SW-K.

The embodiment according to FIGS. 7A and 7B is furthermore characterized in that the first main wing pivot joint 20a, 20b, and 30 and the second main wing pivot joint 26 and 46 of each guide mechanism 16 and 36 respectively lie on different sides of a plane that is defined by the wingspan direction of the main wing SW-H and the adjusting levers 21 and 41. The two main wing levers 18, 19, 38, and 39 of each guide mechanism 16 and 36 also lie on different sides of this plane, i.e., underneath and above the respective high-lift body adjusting levers or adjusting levers 21 and 41. In other words, the axes A1 and A2 are spaced apart from this plane in different directions as indicated in the three-dimensional representation according to FIG. 7B. The defined plane therefore contains the respective adjusting lever 21 and 41, as well as the adjusting lever pivot joint 22, 24, 42, and 44. In this way, each of the guide mechanisms 16 and 36 can be realized in a relatively compact fashion because the arrangement of the coupling to the main wing 12 on different sides of this plane does not result in a conflict between the required freedoms of movement of the two adjusting levers 21 and 41 on either of these sides. In fact, the required space for the guide mechanisms 16 and 36 in the thickness direction of the main wing D-H can be limited to a minimum in this way. This in turn respectively makes it possible to use relatively thin main wings 12 and to arrange all components of the respective guide mechanisms 16 and 36 within the contour of the main wing 12.

FIGS. 8A and 8B show another embodiment of the design of the guide mechanisms 16 and 36. In this case, the first guide mechanism 16 consists of or comprises a particularly simple guide mechanism 16 because only a simple first main wing lever 18 is provided in this case instead of an A-lever for the first main wing lever 18.

The high-lift body adjusting lever or adjusting lever 41 of the second guide mechanism 36 is furthermore divided into two parts 41a and 41b in the present embodiment. Consequently, the second adjusting lever 41 features a front high-lift body adjusting lever or adjusting lever 41a and a rear high-lift body adjusting lever or adjusting lever 41b. Both high-lift body adjusting levers or adjusting levers 41a and 41b are connected to the high-lift body 14 in a rotationally rigid fashion with respect to rotations about the wingspan direction of the high-lift body SW-K at a corresponding location of a connecting device 47. In this way, the two main wing levers 38 and 39 of the second guide mechanism 36 are also automatically spaced apart from one another in the wingspan direction of the main wing SW-H. However, the function of the couplings of the two main wing levers 38 and 39 is not impaired by a divided adjusting lever 41a and 41b. In fact, the high-lift body 14 is guided in the same fashion as in the embodiment according to FIGS. 7A and 7B. In this way, the construction of an inventive wing assembly 10 can be accordingly adapted to the requirements with respect to the contour of the main wing 12 and/or the high-lift body 14 in that individual levers are divided and can be respectively displaced in the wingspan direction of the high-lift body SW-K and in the wingspan direction of the main wing SW-H.

FIGS. 9A and 9B show another embodiment of the present invention. In this variation, an A-lever for the first main wing lever 38 in the form of two first main wing levers 38a and 38b is provided in the second guide mechanism 36. These two first main wing levers 38a and 38b are supported on the main wing 12 in an articulated fashion by two main wing pivot joints 30a and 30b that are spaced apart from one another in the wingspan direction of the main wing SW-H. In the embodiment according to FIGS. 9A and 9B, it should be particularly emphasized that a linear actuator 58 is used in the driving device 50 in this case. This linear actuator 58 acts upon an actuator lever 52 that is realized in the form of an extension of the adjusting lever 21 of the first guide mechanism 16 and in the present embodiment also realized integrally with the adjusting lever 21. In this case, the coupling between the linear actuator 58 and the extended adjusting lever 21 is realized in a universal joint 59. In order to ensure that at least two pivot joints 22 and 24 are provided in the connecting path between the high-lift body 14, the adjusting lever 21, the actuator lever 52, the linear actuator 58 and the main wing 12, the linear actuator 58 itself is directly supported on the main wing 12 in an articulated fashion by another universal joint 59. In this embodiment, one of the levers, namely the adjusting lever 21 of the first guide mechanism 16, is driven in this fashion in order to realize the movement of the high-lift body 14 along the guiding path defined by the two guide mechanisms 16 and 36. In comparison with the embodiment according to the figures described so far, it becomes clear that the location for arranging the driving device 50 can be chosen quite freely due to the functional separation from the guidance by the guide mechanisms 16 and 36.

FIGS. 10A and 10B show another embodiment of an inventive wing assembly 10. In this case, a separate drive in the form of a driving device 50 is once again provided for the high-lift body 14. In this case, however, this driving device 50 is realized in the form of a linear actuator 58 that acts upon the actuator lever 52 without an articulated connection and features universal joints 59 in the connection with the high-lift body 14 and with the main wing 12. The actuator lever 52 in this embodiment is even realized integrally with the linear actuator 58, particularly with its movable piston.

In the embodiment according to FIGS. 10A and 10B, a multiple division of the adjusting levers 21 and 41, as well as the main wing levers 18 and 38, is furthermore realized. In this case, the first guide mechanism 16 is formed in the wingspan direction of the high-lift body SW-K due to the division of the adjusting lever 21 into two adjusting levers 21a and 21b. Furthermore, the line of action of the first main wing lever 18 of the first guide mechanism 16 is inclined relative to the lines of action of the first main wing levers 38a and 38b of the second guide mechanism 36 about an axis that extends in the direction of the chord direction of the high-lift body T-K such that this first guide mechanism 16 is once again supported against loads in the wingspan direction of the main wing T-H.

The adjusting lever 41 of the second guide mechanism 36 is also divided in a similar fashion in the embodiment according to FIGS. 10A and 10B. However, the adjusting lever is divided into three parts in this case, i.e., into three adjusting levers 41a, 41b and 41c. In this way, the first main wing lever 38 is simultaneously divided into a front first main wing lever 38a and a rear first main wing lever 38b. These two main wing levers 38a and 38b are spaced apart from one another in the wingspan direction of the main wing SW-H and respectively coupled to the main wing 10 separately by respective main wing pivot joints 30a and 30b, as well as coupled to the respective adjusting levers 41a and 41b by adjusting lever pivot joints 42a and 42b that are spaced apart from one another in the wingspan direction of the high-lift body SW-K. In this way, a wider support of the high-lift body adjusting lever 41 and therefore of the entire second guide mechanism 36 is achieved in the wingspan direction of the main wing SW-H.

Figure 11A:
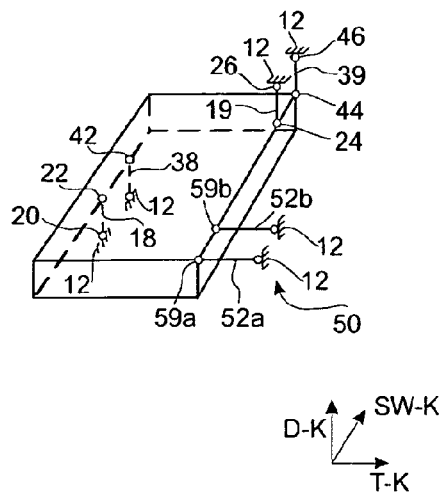
FIG. 11A schematically shows an embodiment of inventive guide mechanisms.
Figure 11B:
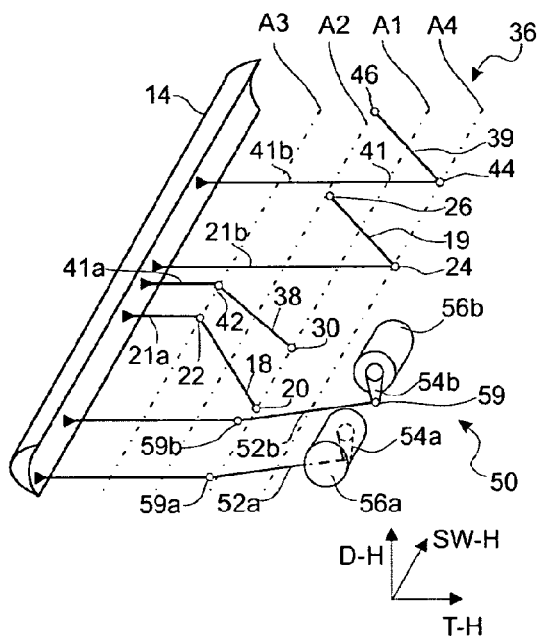
FIG. 11B shows the geometric arrangement of the guide mechanisms according to FIG. 11A.

FIGS. 11A and 11B show another embodiment of an inventive wing assembly 10. A division is basically also realized in this case by dividing the two adjusting levers 21 and 41 in the wingspan direction of the high-lift body SW-K as already described several times above. Furthermore, two rotary actuators 56a and 56b that are spaced apart from one another in the wingspan direction of the main wing SW-H are provided in a driving device 50 in this embodiment.

FIGS. 11A and 11B also clearly show that the inventive principle not only makes it possible to divide the individual levers of the individual guide mechanism 16 and 36, but also to essentially position the corresponding driving device 50 freely. In other words, a functional separation between the "guiding" and "driving" tasks of the high-lift body 14 is realized due to the inventive design. This results in the broadest freedom of design possible with respect to the constructive realization of the individual guide mechanisms 16 and 36 as well as the driving device 50.

Figure 12A:
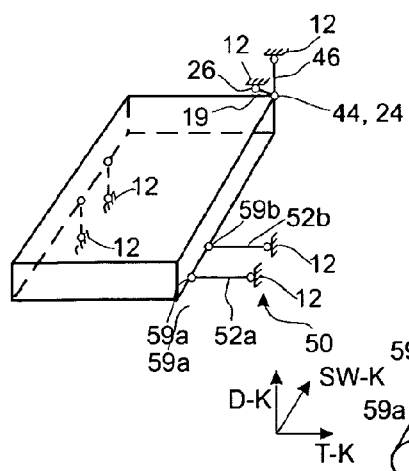
FIG. 12A schematically shows an embodiment of inventive guide mechanisms.
Figure 12B:
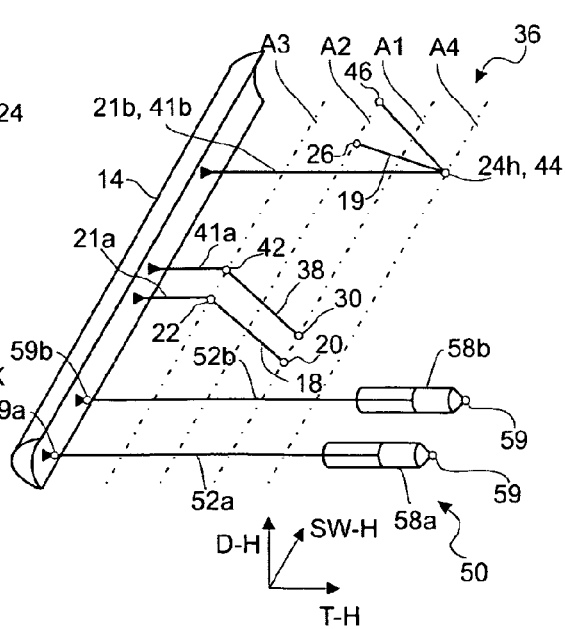
FIG. 12B shows the geometric arrangement of the guide mechanisms according to FIG. 12A.

FIGS. 12A and 12B show another embodiment of the present invention. In this embodiment, the two rotary actuators 56a and 56b according to FIG. 11B are replaced with linear actuators 58a and 58b of the type illustrated, for example, in FIG. 10B. Furthermore, the adjusting levers 21 and 41 are also divided in this case. In the embodiment according to FIG. 12B, parts of the two guide mechanisms 16 and 36 coincide with one another. In this embodiment, the second main wing levers 19 and 39 are essentially realized in the form of A-levers and common adjusting levers 21 and 41 respectively form part of the high-lift body levers 21b and 41b. The spaced-apart design of the two guide mechanisms 16 and 36 in the wingspan direction of the main wing SW-H is realized due to the division of the respective adjusting levers 21 and 41 such that a support against torques about the chord direction of the main wing T-H can also be realized in this fashion. This once again clearly shows the broad freedom of design with respect to the actual constructive realization of the present invention.

Figure 13A:
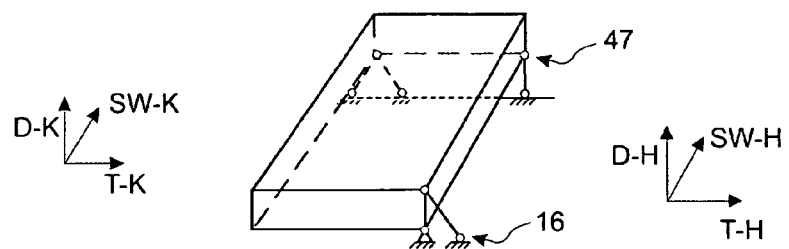
FIG. 13A schematically shows an embodiment of inventive guide mechanisms.
Figure 13B:
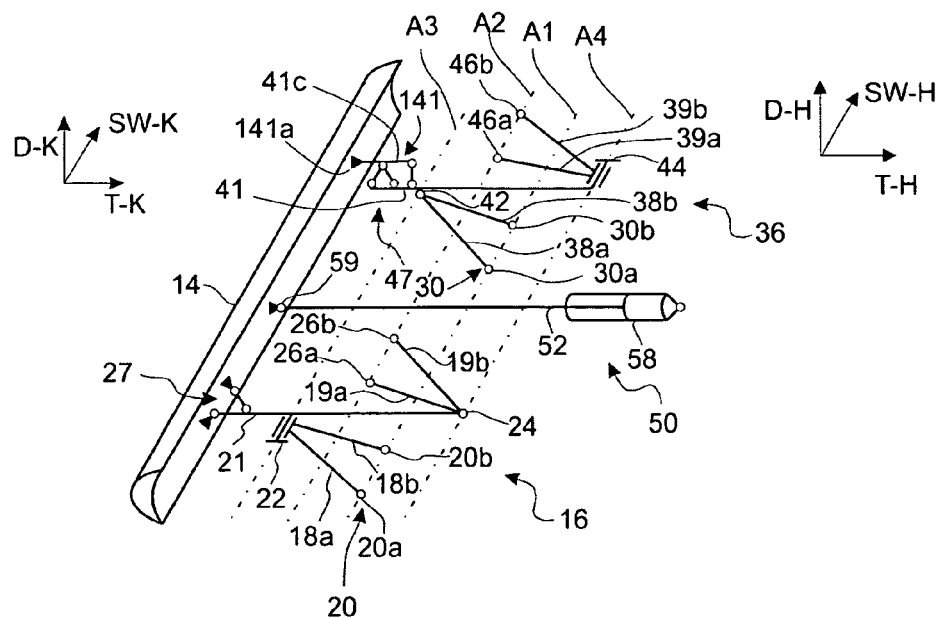
FIG. 13B shows the geometric arrangement of the guide mechanisms according to FIG. 13A.

FIGS. 13A and 13B show another embodiment of the present invention. In this embodiment, parts of the two guide mechanisms 16 and 36 are designed in such a way that they make it possible to realize a support against forces in the wingspan direction of the main wing SW-H. In the present embodiment, this is realized in an exemplary fashion on two joints. The adjusting lever pivot joint 22 in the first guide mechanism 16 and the adjusting lever pivot joints 44 in the second guide mechanism 36 are realized in the form of axial joints. Such an axial joint with an axis of rotation along the wingspan direction of the main wing SW-H makes it possible to realize a support against forces in the wingspan direction of the main wing SW-H within this joint.

In the embodiment according to FIGS. 13A and 13B, each of the main wing levers 18, 19, 38 and 39 is furthermore realized in the form of an A-lever such that the support against forces in the wingspan direction of the main wing SW-H is additionally improved.

Another peculiarity of the embodiment according to FIGS. 13A and 13B is the coupling of the respective adjusting levers 21 and 41 to the high-lift body 14. In this case, the respective connecting devices 27 and 47 are realized in such a way that the connection is rotationally rigid with respect to torques about the wingspan direction of the high-lift body SW-K, but provides freedom of motion in all other rotating directions of the high-lift body 14. This is particularly advantageous because jamming of the high-lift body 14, for example, due to bending or twisting of the main wing 12 is prevented in this fashion. This jamming safety is realized in the two connecting devices 27 and 47 in that they produce a connection with multiple articulations between the respective adjusting levers 21 and 41 and the high-lift body 14. The coupling to the high-lift body 14 is in all instances realized such that the joints generally allow rotations, but no rotation about the wingspan direction of the high-lift body SW-K due to their coupling, for example, in the form of an A-lever. In this way, it is ensured that the connecting devices 27 and 47 provide support at least against torques about the wingspan direction of the high-lift body SW-K, but have degrees of freedom in all other rotating directions.

Figures 14A, 14B:
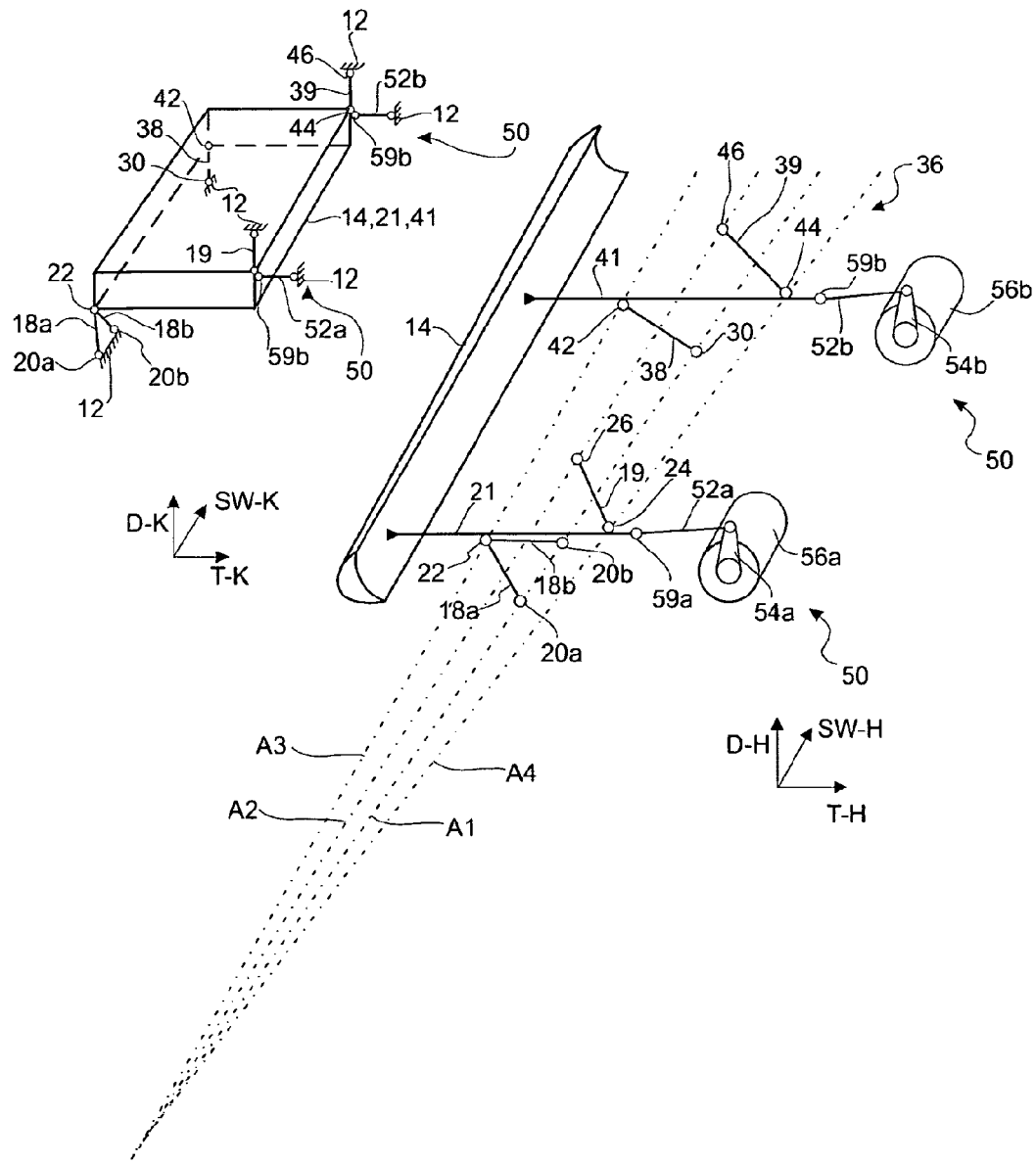
FIG. 14A schematically shows an embodiment of inventive guide mechanisms.
FIG. 14B shows the geometric arrangement of the guide mechanisms according to FIG. 14A.

Another exemplary embodiment of the present invention is illustrated in FIGS. 14A and 14B. The peculiarity of this embodiment is the arrangement of the individual pivot joints 20a, 20b, 22, 24, 26, 30, 42, 44 and 46. In contrast to all embodiments in the preceding figures in which all pivot joints are positioned on corresponding axes A1, A2, A3 and A4 between the individual guide mechanisms 16 and 36 that essentially lie parallel to one another, the same arrangement of axes A1, A2, A3, and A4 is provided in the embodiment according to FIGS. 14A and 14B but the axes A1, A2, A3 and A4 essentially extend in a radiated fashion. In the preceding embodiments according to FIGS. 7A to 13B, the axes A1, A2, A3, and A4 essentially extend parallel to one another. The embodiment according to FIGS. 14A and 14B has the advantage that it is even better adapted to the actual situation in a main wing 12. At this location, an arrangement of essentially radiated axes A1, A2, A3, and A4 is advantageous with respect to the bearing positions of the individual pivot joints of the guide mechanisms 16 and 36 because the geometric shape of the main wing 12 is not realized with parallel leading and trailing edges, but rather features leading edges and trailing edges that are arranged angular to one another. In order to take into account the geometry of the main wing 12 in this case, it may be advantageous if the individual axes A1, A2, A3 and A4, on which the pivot joints of the individual guide mechanisms 16 and 36 are arranged, follow the geometric shape of the main wing 12 that is asymmetric in this direction. This may be realized, for example, with the radiated arrangement of the axes A1, A2, A3 and A4 illustrated in FIG. 14B.

In the embodiment according to FIGS. 14A and 14B, a division of the driving device 50 is furthermore realized. In this case, two rotary actuators 56a and 56b are provided that directly act upon the respective adjusting levers 21 and 41 with corresponding actuator levers 52a and 52b. This embodiment once again clearly shows how a particularly broad freedom of design in the actual construction of the lever ratios for an inventive wing assembly 10 can be achieved due to the separation of the driving principle realized by the driving device 50 and the guiding principle realized by the guide mechanisms 16 and 36.

Figure 15:
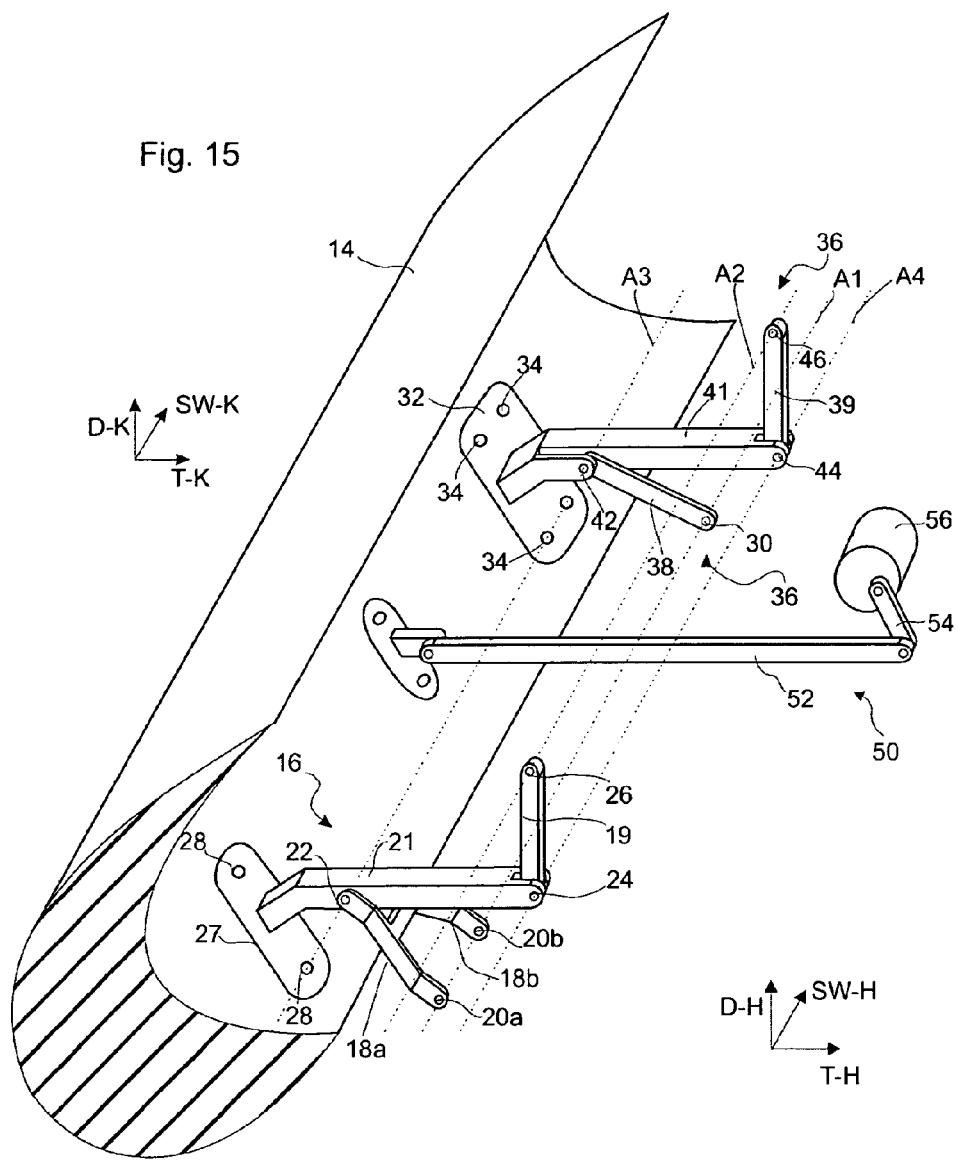
FIG. 15 shows a three-dimensional representation of an embodiment of the guide mechanisms.

FIG. 15 essentially shows the embodiment according to FIGS. 7A and 7B, but a three-dimensional structure, the construction of which is already completed, is illustrated in this case. This figure clearly shows that the individual levers, i.e., the main wing levers 18a, 18b, 19, 38 and 39, as well as the adjusting levers 21 and 41, extend in their third dimension and consequently form guide gears with a cross section. In this way, different couplings can be respectively realized between the individual levers 18a, 18b, 19, 38, and 39 and on the high-lift body 14 and the main wing 12. For example, it is possible to space apart one lever from another lever in the wingspan direction as illustrated with respect to the second guide mechanism 36 in FIG. 15. In this case, the first main wing lever 38 is arranged slightly offset relative to the second main wing lever 39 in the wingspan direction of the main wing SW-H in such a way that it is laterally coupled to the adjusting lever 41 in a corresponding adjusting lever pivot joint 42.

In addition, the rotationally rigid connection between the two adjusting levers 21 and 41 and the high-lift body 14 is realized in such a way that the respective adjusting levers 21 and 41 are connected to the high-lift body 14 by screws or rivets in this exemplary embodiment. Essentially all pivot joints 20a, 20b, 22, 24, 26, 30, 42, 44 and 46 in this embodiment are realized in the form of spherical joints that allow a rotation about all axes A1, A2, A3, and A4.

Figure 16:
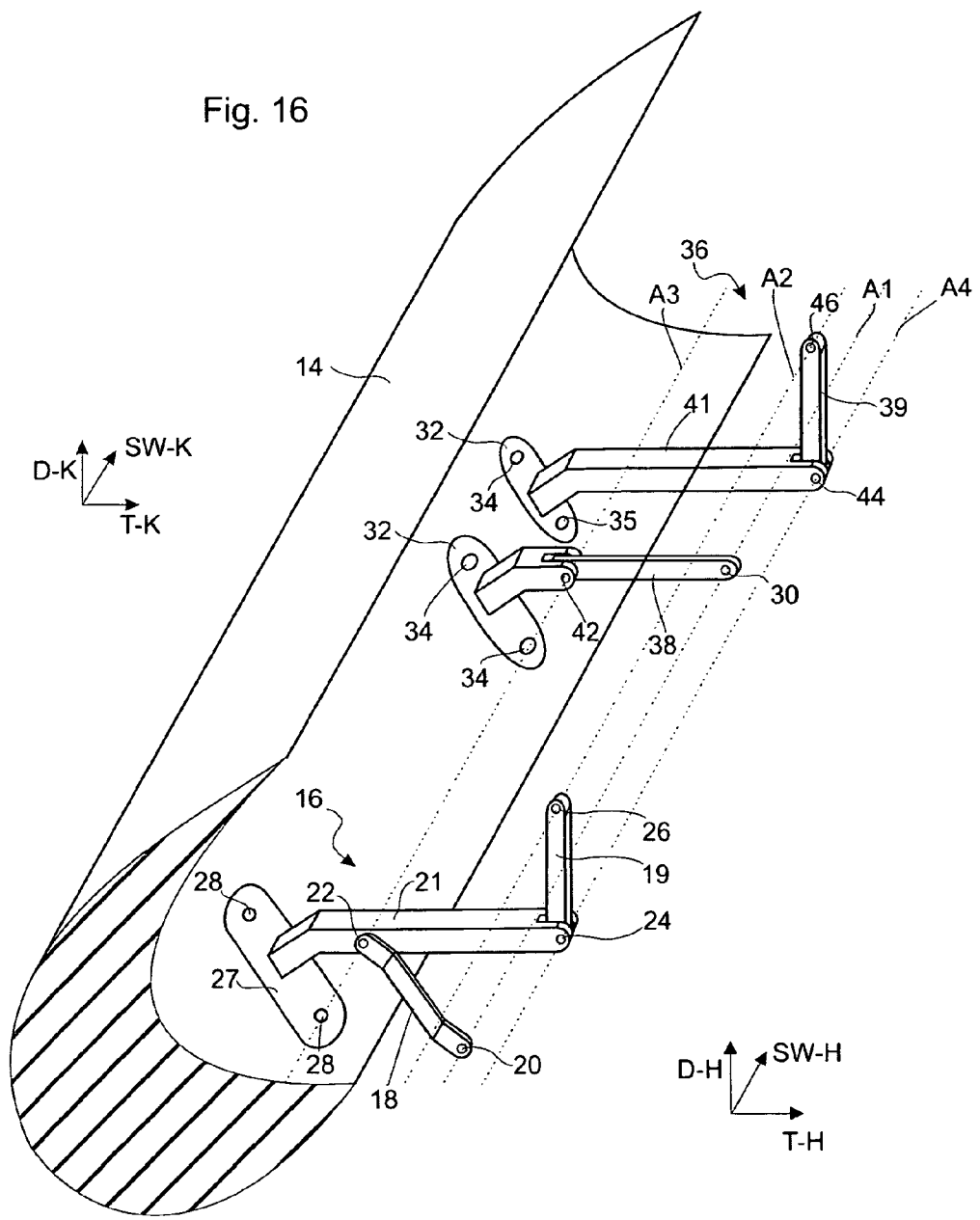
FIG. 16 shows a three-dimensional representation of another embodiment of the two guide mechanisms.

Analogous to FIG. 15, the three-dimensional construction of an embodiment of the type described in greater detail above with reference to FIGS. 8A and 8B is illustrated in FIG. 16.

Figure 17:
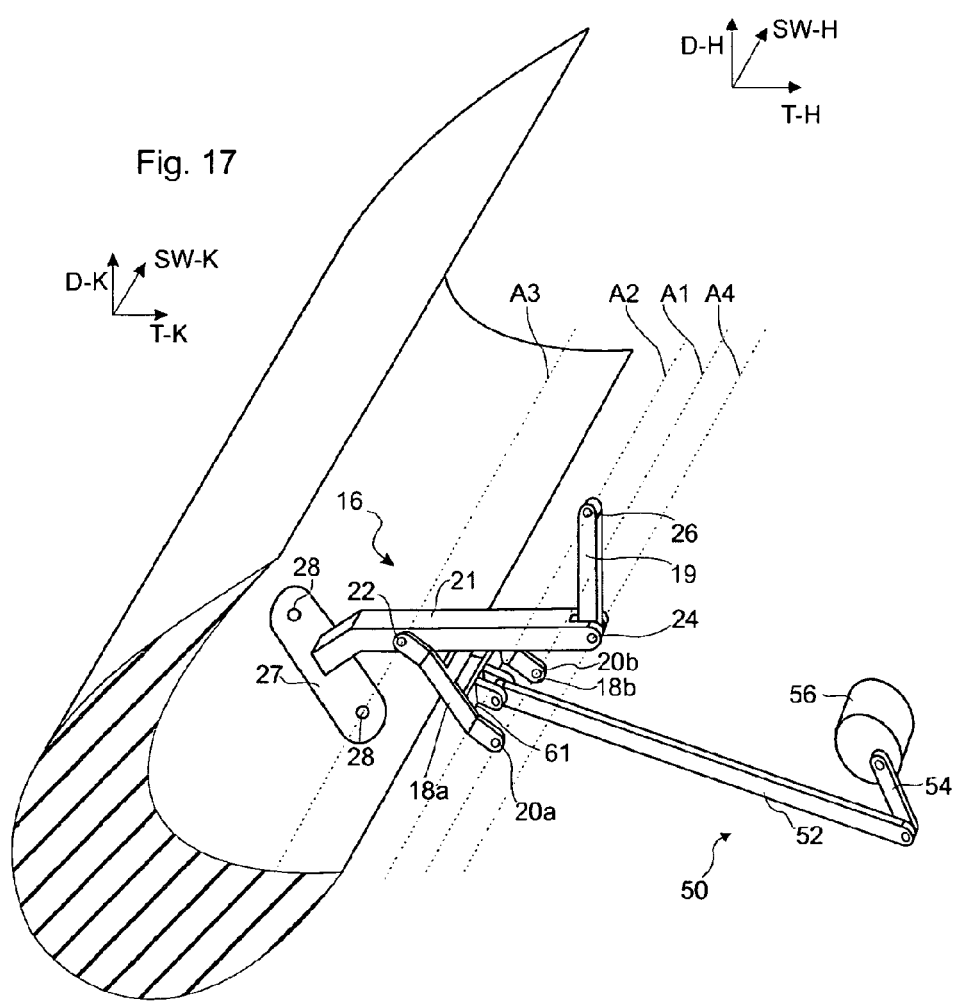
FIG. 17 shows a three-dimensional representation of another embodiment of one of the guide mechanisms.

FIG. 17 shows a special embodiment of one of the two guide mechanisms 16 and 36, namely the first guide mechanism 16. The second guide mechanism 36 is not illustrated in this figure in order to provide a better overview. The peculiarity of the embodiment according to FIG. 17 can be seen in that the first main wing lever 18 realized in the form of an A-lever, i.e., two main wing levers 18a and 18b, features a cross brace, on which the driving device 50 engages with its actuator lever 52. In this way, a particularly simple construction element in the form of an A-lever is provided for the first main wing lever 12, wherein the construction element not only fulfills the lever function for the guide mechanism 16, but also allows a simple coupling of the driving device 50.

A plurality of exemplary options for realizing the drive by the driving device 50 is illustrated in the preceding figures and in FIG. 17. For example, the actuator lever 52 may be directly connected to the high-lift body 14 or to one of the high-lift flap adjusting levers or adjusting levers 21 or 41 or to one of the main wing levers 18a or 18b as illustrated in FIG. 17. In this case, the actuator may consist of or comprise a rotary actuator 56 of the type illustrated in FIG. 17 or of a linear actuator 58 of the type used in a few of the preceding exemplary embodiments.

Figure 18:
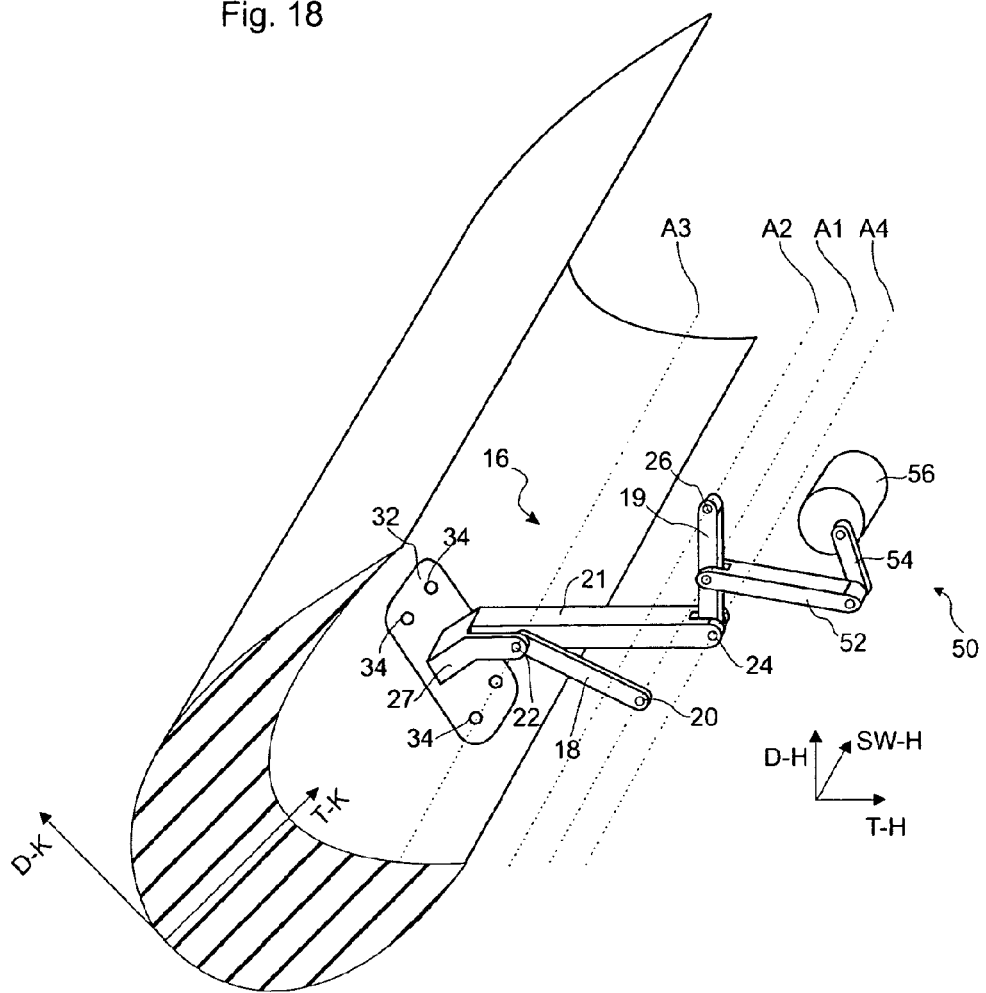
FIG. 18 shows a three-dimensional representation of yet another embodiment of an inventive guide mechanism.

FIG. 18 shows an alternative embodiment of FIG. 17, wherein a rotary actuator 56 acts upon the second main wing lever 19 of the first guide mechanism 16 by an actuator lever 52 in this example. This represents an alternative embodiment of FIG. 17. It would naturally also be conceivable to realize a parallel design, i.e., an arrangement of two rotary actuators 56 that act upon both main wing levers 18 and 19 of the first guide mechanism 16. In order to provide a better overview, a second guide mechanism 36 that is spaced apart from the first guide mechanism 16 in the wingspan direction of the main wing SW-H is also not illustrated in FIG. 18.

It goes without saying that all above-described designs merely represent exemplary embodiments. The individual components, particularly the individual designs of the driving device 50 and the guide mechanisms 16 and 36, naturally can be freely combined with one another if this is deemed technically sensible. Based on the above-described embodiments, it was explained how broad the freedom of design is in the actual realization of an inventive wing assembly 10 with inventive guide mechanisms 16 and 36, as well as an inventive driving device 50. The present invention therefore cannot be limited to one of these embodiments, but rather claims the basic principle of this arrangement.

The individual levers, particularly the high-lift body adjusting lever or adjusting lever 21 and 41, should be interpreted in a functional sense in accordance with the invention. This means, for example, that the high-lift body adjusting lever or adjusting lever 21 or 41 may consist of or comprise several parts and therefore be divided, particularly in the wingspan direction of the high-lift body SW-K. Such a division may be realized in that the high-lift body adjusting lever or adjusting lever 21 or 41 extends over the high-lift body 14 beyond the connecting device. Such a design results in an additional support against forces in the wingspan direction of the high-lift body SW-K. Analogously, one or more main wing levers 18, 19, 38 and 39 naturally may also consist of or comprise several parts. A multi-part design may be realized, for example, in the form of three-dimensional lever geometries such as an A-lever that also brings about a support against forces that act upon the corresponding main wing lever 18, 19, 38, and 39 in the wingspan direction of the main wing SW-H.

LIST OF REFERENCE SYMBOLS

2 Pressure profile
4 First contour surface section
4a First contour surface section
4b Second contour surface section
4c Location of the main wing closest to the trailing edge of the high-lift body
5 Trailing edge of high-lift body
6 Second contour surface section
10 Wing assembly
12 Main wing
14 High-lift body
16 First guide mechanism
18 First main wing lever of first guide mechanism
18a Front first main wing lever of first guide mechanism
18b Rear first main wing lever of first guide mechanism
19 Second main wing lever of first guide mechanism
20 First main wing pivot joint of first guide mechanism
20a Front first main wing pivot joint of first guide mechanism
20b Rear first main wing pivot joint of first guide mechanism
21 High-lift body adjusting lever or adjusting lever
21a Front high-lift body adjusting lever or adjusting lever
21b Rear high-lift body adjusting lever or adjusting lever
22 First adjusting lever pivot joint of first guide mechanism
24 Second adjusting lever pivot joint of the first guide mechanism
26 Second main wing pivot joint of first guide mechanism
27 Rotationally rigid connecting device
30 First main wing pivot joint of second guide mechanism
30a Front first main wing pivot joint of second guide mechanism
30b Rear first main wing pivot joint of second guide mechanism
34 Rotationally rigid connecting device
36 Second guide mechanism
38 First main wing lever of second guide mechanism
38a Front first main wing lever of second guide mechanism
38b Rear first main wing lever of second guide mechanism
39 Second main wing lever of second guide mechanism
40 First main wing pivot joint of second guide mechanism
40a Front first main wing pivot joint of second guide mechanism
40b Rear first main wing pivot joint of second guide mechanism
41 High-lift body adjusting lever or adjusting lever
41a Front high-lift body adjusting lever or adjusting lever
41b Rear high-lift body adjusting lever or adjusting lever
41c Additional rear high-lift body adjusting lever or adjusting lever
42 First adjusting lever pivot joint of second guide mechanism
42a Front first adjusting lever pivot joint of second guide mechanism
42b Rear first adjusting lever pivot joint of second guide mechanism
44 Second adjusting lever pivot joint of second guide mechanism
46 Second main wing pivot joint of second guide mechanism
47 Rotationally rigid connecting device
50 Driving device
52 Actuator lever
52a Front actuator lever
52b Rear actuator lever
54 Driving arm
54a Front driving arm
54b Rear driving arm
56 Rotary actuator
56a Front rotary actuator
56b Rear rotary actuator
58 Linear actuator
58a Front linear actuator
58b Rear linear actuator
59 Universal joint
59a Front universal joint
59b Rear universal joint
$c_p$ Pressure coefficient
R1 First radius
R2 Second radius
R3 Third radius
S1 Suction side
S2 Pressure side
S3 Flow direction
D-H Thickness direction of main wing
SW-H Wingspan direction of main wing
T-H Chord direction of main wing
D-K Thickness direction of high-lift body
SW-K Wingspan direction of high-lift body
T-K Chord direction of high-lift body
A1 First axis of rotation
A2 Second axis of rotation
A3 Third axis of rotation
A4 Fourth axis of rotation

The invention claimed is:

1. A wing assembly comprising a main wing, at least one high-lift body on the leading edge of the main wing such that the high-lift body can be moved between an initial adjusting position and a maximally changed adjusting position with respect to the initial adjusting position, at least one guide mechanism by which the high-lift body is movably coupled to the main wing, and a driving device for adjusting the high-lift body, wherein the at least one guide mechanism comprises:

an adjusting lever arrangement comprising at least one adjusting lever, wherein at least one of the at least one adjusting levers of the adjusting lever arrangement is non-rotatably coupled to the high-lift body, at least one first main wing lever that is coupled to the main wing by a first main wing pivot joint and to at least one of the at least one adjusting levers by a first adjusting lever pivot joint such that an effective lever arm is formed between the first adjusting lever pivot joint and the high-lift body, at least one second main wing lever that is coupled to the main wing by a second main wing pivot joint and to at least one of the at least one adjusting levers by a second adjusting lever pivot joint such that an effective lever arm is formed between the second adjusting lever pivot joint and the first adjusting lever pivot joint, wherein the at least one guide mechanism is realized in such a way that the first main wing pivot joint is arranged underneath the first adjusting lever pivot joint and the second main wing pivot joint is arranged above the second adjusting lever pivot joint with respect to a main wing thickness direction in the initial adjusting position of the high-lift body;

or wherein the at least one guide mechanism is realized in such a way that the first main wing pivot joint is arranged above the first adjusting lever pivot joint and the second main wing pivot joint is arranged underneath the second adjusting lever pivot joint with respect to a main wing thickness direction in the initial adjusting position of the high-lift body.

2. The wing assembly of claim 1, wherein the at least one guide mechanism is designed in such a way that the high-lift body comprises a trailing edge such that a contour line of the high-lift body extending along the wingspan direction thereof and the trailing edge of the high-lift body extend, at least sectionally, at one or more of a predetermined constant distance or a relatively small, aerodynamically ineffective distance from the contour surface of the main wing while the high-lift body is adjusted, wherein the high-lift body is guided by the at least one guide mechanism in such a way during the movement of the high-lift body that, between the high-lift body's initial adjusting position and maximally changed adjusting positions, a rearmost contour line of the high-lift body with respect to a high-lift body chord direction is spaced apart from an outer contour surface of the main wing by no more than 10 mm at least in a first and a second contour surface section of the main wing or in an entire adjusting range of the high-lift body.

3. The wing assembly of claim 1, wherein an outer contour surface of the main wing in a region of the trailing edge of the high-lift body comprises, in the high-lift body's initial adjusting position, a first contour surface section that, viewed in a main wing chord direction, is behind a rearmost contour line of the high-lift body with respect to a high-lift body chord direction and covered by the high-lift body, as well as a second contour surface section that is behind the first contour surface section, viewed in the main wing chord direction, profile lines extending along the main wing chord direction in the first and the second contour surface section comprise no sharp bends, wherein the lengths of the first contour surface section and the second contour surface section in the high-lift body chord direction respectively correspond to half of a maximum thickness of the high-lift body.

4. The wing assembly of claim 1, wherein the first and the second adjusting lever pivot joints comprise spherical joints.

5. The wing assembly of claim 1, wherein the main wing pivot joints of a first guide mechanism of the at least one guide mechanism and one or more of the first adjusting lever pivot joint and the second adjusting lever pivot joint comprise spherical joints and at least one main wing pivot joint of a second guide mechanism of the at least one guide mechanism comprises an axial joint with an axis of rotation that extends along a wingspan direction of the high-lift body.

6. The wing assembly of claim 1, wherein one or more of the first adjusting lever pivot joints of a first guide mechanism of the at least one guide mechanism and a second adjusting lever pivot joint of a second guide mechanism of the at least one guide mechanism comprise axial joints that respectively allow an axial movement, wherein an axial joint component is respectively fixed in a main wing wingspan direction by the at least one first and second main wing levers, and at least one of each of the at least first and second main wing levers are respectively coupled to the other first or second adjusting lever pivot joint in such a way that the adjusting lever pivot joints are fixed in the main wing wingspan direction.

7. The wing assembly of claim 1, wherein the adjusting lever arrangement of the at least one guide mechanism comprises at least two adjusting levers, wherein the adjusting levers of the adjusting lever arrangement are respectively coupled to the high-lift body in a rotationally rigid fashion, at least with respect to rotations about a high-lift body wingspan direction, wherein at least a first adjusting lever of the at least two adjusting levers of the adjusting lever arrangement is coupled to the first main wing lever by the first adjusting lever pivot joint and at least a second adjusting lever of the at least two adjusting levers of the adjusting lever arrangement is coupled to the second main wing lever by the second adjusting lever pivot joint, or a first adjusting lever of the at least two adjusting levers of the adjusting lever arrangement is coupled to the main wing by at least one first main wing lever that is coupled thereto by at least one first main wing pivot joint and coupled to the at least one first adjusting lever by the first adjusting lever pivot joint, wherein the first adjusting lever is also coupled to the main wing by at least one second main wing lever that is coupled to the first adjusting lever by the second adjusting lever pivot joint and respectively coupled to the main wing by the at least one second main wing pivot joint, wherein at least one second adjusting lever of the at least two adjusting levers of the adjusting lever arrangement is coupled to the high-lift body in a rotationally rigid fashion, at least with respect to rotations about a high-lift body wingspan direction, and wherein the at least one second adjusting lever of the at least two adjusting levers of the adjusting lever arrangement is coupled to the first adjusting lever of the at least two adjusting levers of the adjusting lever arrangement in such a way that adjusting movements carried out thereby and one or more of translatory adjusting movements in a high-lift body chord direction and a high-lift body thickness direction and rotatory adjusting movements about a high-lift body wingspan direction are transmitted to the at least one second adjusting lever of the at least two adjusting levers of the adjusting lever arrangement.

8. The wing assembly of claim 1, wherein the driving device comprises at least one actuator that is connected to the main wing to move at least one of the at least one guide mechanisms, wherein the at least one actuator is connected to at least one of the main wing levers of the at least one guide mechanism, one of the adjusting levers of the at least one guide mechanism, or the high-lift body.

9. The wing assembly of claim 8, wherein the at least one actuator comprises an actuator lever on the main wing [and is connected to the high-lift body, wherein a total of at least two universal joints between at least one of the high-lift body and the actuator lever, the actuator lever and the actuator, or the actuator and the main wing are in a connecting path between the main wing and the high-lift body.

10. The wing assembly of claim 1, wherein the wing assembly further comprises one or more of
- at least one of the first and second main wing levers comprises two lever arms that are jointly coupled to the respective adjusting lever by one of the first and second adjusting lever pivot joints on an end and to the main wing by one of the first and second main wing pivot joints, having separate pivot parts that are spaced apart from one another in a wingspan direction of the main wing, on another end, and
- at least one of the main wing levers comprises two lever arms that are jointly coupled to the main wing by one of the main wing pivot joints on an end and to an adjusting lever by high-lift body pivot joints that are spaced apart from one another in the wingspan direction of the main wing on another end.

11. A method for adjusting a high-lift body relative to a main wing of a wing assembly between an initial adjusting position and a changed adjusting position with respect to the initial adjusting position, wherein the high-lift body is adjusted by:
- moving at least one adjusting lever coupled non-rotatably to the high-lift body,
- moving at least one first main wing lever that is coupled to the main wing and to the at least one adjusting lever such that a lever arm is formed between a first adjusting lever pivot joint, by which the main wing lever is coupled to the at least one adjusting lever, and the high-lift body,
- moving at least one second main wing lever that is coupled to the main wing and to the at least one adjusting lever such that a lever arm is formed between the first adjusting lever pivot joint and a second adjusting lever pivot joint, by which the main wing lever is coupled to the at least one adjusting lever,
- wherein a guide mechanism is realized in such a way that a first main wing pivot joint is arranged underneath the first adjusting lever pivot joint and a second main wing pivot joint is arranged above the second adjusting lever pivot joint with respect to a main wing thickness direction in the initial adjusting position of the high-lift body;

or
- wherein a guide mechanism is realized in such a way that a first main wing pivot joint is arranged above the first adjusting lever pivot joint and a second main wing pivot joint is arranged underneath the second adjusting lever pivot joint with respect to a main wing thickness direction in the initial adjusting position of the high-lift body.

* * * * *

UNITED STATES PATENT AND TRADEMARK OFFICE
CERTIFICATE OF CORRECTION

PATENT NO. : 9,334,043 B2
APPLICATION NO. : 14/138715
DATED : May 10, 2016
INVENTOR(S) : Schlipf et al.

It is certified that error appears in the above-identified patent and that said Letters Patent is hereby corrected as shown below:

In the claims,
In column 28, line 65
Replace "actuator comprises an actuator level on the main wing [and is"
with --actuator comprises an actuator level on the main wing and is--.

Signed and Sealed this
Nineteenth Day of July, 2016

Michelle K. Lee
*Director of the United States Patent and Trademark Office*